(12) United States Patent
Ouderkirk et al.

(10) Patent No.: US 11,243,333 B1
(45) Date of Patent: Feb. 8, 2022

(54) NANOVOIDED OPTICAL STRUCTURES AND CORRESPONDING SYSTEMS AND METHODS

(71) Applicant: Facebook Technologies, LLC, Menlo Park, CA (US)

(72) Inventors: Andrew John Ouderkirk, Menlo Park, CA (US); Qi Zhang, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 162 days.

(21) Appl. No.: 16/170,002

(22) Filed: Oct. 24, 2018

(51) Int. Cl.
*G02B 1/11* (2015.01)
*G02B 6/02* (2006.01)
(Continued)

(52) U.S. Cl.
CPC .............. *G02B 1/11* (2013.01); *G02B 6/0208* (2013.01); *G02B 27/0172* (2013.01); *G02B 27/28* (2013.01)

(58) Field of Classification Search
CPC . G02B 3/00; G02B 1/041; G02B 1/04; G02B 13/0085; G02B 7/02; G02B 19/0061; G02B 1/002; G02B 3/0012; G02B 7/022; G02B 7/025; G02B 1/043; G02B 13/004; G02B 19/0014; G02B 19/0028; G02B 1/10; G02B 1/14; G02B 2207/101; G02B 3/0037; G02B 13/0045; G02B 27/0025; B29D 11/00009; B29D 11/0073; B29D 11/0048; B29D 11/00365; B29D 11/00278; B29D 11/00307; B29D 11/00317;
(Continued)

(56) References Cited

U.S. PATENT DOCUMENTS

| | | | | | |
|---|---|---|---|---|---|
| 5,337,191 | A | * | 8/1994 | Austin | .................... C03C 17/36 359/359 |
| 6,166,855 | A | * | 12/2000 | Ikeyama | .................. G02B 1/11 359/580 |

(Continued)

OTHER PUBLICATIONS

Mullin et al., "Pattern Transformation Triggered by Deformation", Physical Review Letters, vol. 99, No. 8, 2007, 4 pages.
(Continued)

*Primary Examiner* — William R Alexander
*Assistant Examiner* — Sharrief I Broome
(74) *Attorney, Agent, or Firm* — FisherBroyles, LLP

(57) ABSTRACT

Optical structures, such as antireflective structures or Bragg gratings, may include multiple layers of high-index and low-index materials. The low-index materials may be approximately a quarter-wavelength in thickness (e.g., with respect to a center wavelength of incident light) and may include a nanovoided material. The high-index material may have a thickness of a half-wavelength and may include an oxide. The nanovoided material may include about 10% to 90% nanovoids by volume and may have an average index of refraction of about 1.05 to about 1.2. The antireflective structures or Bragg gratings may include multiple layers that can be optimized for layer count, thicknesses, and refractive indices to provide a reflectance below a given threshold for incident light of a given angular range. Various other methods, systems, apparatuses, and materials are also disclosed.

14 Claims, 14 Drawing Sheets

(51) Int. Cl.
*G02B 27/01* (2006.01)
*G02B 27/28* (2006.01)

(58) Field of Classification Search
CPC ........ B29D 11/00346; B29D 11/00413; B29D
11/00432; B29D 11/00442; B29D
11/00192; B29D 11/00375; B29D
11/00403; B29D 11/00451; B29D
11/00634; B29D 11/0074; B29D
11/00865; H01L 2924/00; H01L
2924/0002; H01L 2224/48091; H01L
27/14618; H01L 27/14625; H01L
27/14685; H01L 2924/12042; H01L
31/0543; H01L 27/14627; H01L
2924/00014; H01L 31/02325; H01L
31/0547; H01L 33/54; H01L 2224/04042;
H01L 2224/48464; H01L 24/05; H01L
27/146; H01L 27/14623; H01L 27/14632;
H01L 27/14687; Y10T 428/24355; Y10T
156/10; Y10T 156/1052; Y10T
428/24479; Y10T 428/24612; Y10T
428/24802; Y10T 428/2481; Y10T
428/24917; Y10T 156/1056; Y10T
29/49826; Y10T 428/24273; Y10T
428/24322; Y10T 428/24331; Y10T
428/249921; Y10T 428/265; Y10T
428/2929; Y10T 428/31504; Y10T
428/3154; Y10T 83/04; Y10T 83/0524;
B29C 45/16; B29C 45/2708; B29C 45/34;
B29C 2035/0811; B29C 2045/0094;
B29C 2045/14942; B29C 2045/2683;
B29C 2791/008; B29C 45/0025; B29C
45/14; B29C 45/14016; B29C 45/1634;
B29C 45/1671; B29C 45/27; B29C
45/568; B29C 45/73; B29C 2045/0027;
B29C 2045/0058; B29C 2045/2714;
B29C 2045/5635; H01S 5/183; H01S
5/423; H01S 3/005; H01S 3/0612; H01S
3/0627; H01S 3/094053; H01S 3/09415;
H01S 3/113; H01S 3/1611; H01S 3/1643;
H01S 5/02284; H01S 5/02288; H01S
5/18361; H01S 2301/166; H01S 3/025;
H01S 3/06708; H01S 3/08059; H01S
3/094049; H01S 3/1022; H01S 3/106;
B32B 2551/00; B32B 3/10; B32B 15/08;
B32B 1/00; B32B 2037/1253; B32B
2250/02; B32B 2255/10; B32B 2255/26;
B32B 2307/732; B32B 2309/02; B32B
2309/12; B32B 2333/12; B32B 2367/00;
B32B 2379/08; B32B 27/08; B32B
27/281; B32B 27/285; B32B 27/308;
B32B 27/32; B32B 27/34
See application file for complete search history.

(56) References Cited

U.S. PATENT DOCUMENTS

| 7,839,550 | B1 | 11/2010 | Billmers et al. | |
|---|---|---|---|---|
| 9,720,141 | B1 | 8/2017 | Cheng et al. | |
| 2002/0186928 | A1* | 12/2002 | Curtis | G02B 6/29314 |
| | | | | 385/37 |
| 2002/0191268 | A1* | 12/2002 | Seeser | G02B 26/001 |
| | | | | 359/260 |
| 2004/0036932 | A1 | 2/2004 | Korzinin et al. | |
| 2007/0020404 | A1 | 1/2007 | Seiberle et al. | |
| 2007/0202273 | A1* | 8/2007 | Hirai | G02F 1/133528 |
| | | | | 428/1.31 |
| 2009/0268299 | A1 | 10/2009 | Furui et al. | |
| 2010/0002190 | A1* | 1/2010 | Clarke | G02C 7/101 |
| | | | | 351/159.44 |
| 2010/0314704 | A1* | 12/2010 | Matsugai | H01L 27/14632 |
| | | | | 257/432 |
| 2013/0215513 | A1 | 8/2013 | Liang et al. | |
| 2014/0080040 | A1 | 3/2014 | Fontecchio et al. | |
| 2015/0192728 | A1* | 7/2015 | Thompson | G02B 6/0005 |
| | | | | 362/624 |
| 2015/0301667 | A1* | 10/2015 | Yano | G06F 3/0445 |
| | | | | 345/173 |
| 2015/0346416 | A1* | 12/2015 | Wolk | G02B 6/0066 |
| | | | | 326/606 |
| 2017/0192595 | A1 | 7/2017 | Choi et al. | |
| 2017/0362502 | A1* | 12/2017 | Lee | H01L 33/502 |
| 2018/0093456 | A1 | 4/2018 | Van Overmeere et al. | |
| 2019/0310394 | A1* | 10/2019 | Miyamoto | C23C 14/562 |

OTHER PUBLICATIONS

Babaee et al., "3D Soft Metamaterials with Negative Poisson's ratio", Advanced Materials, vol. 25, No. 36, 2013, 18 pages.

Bertoldi et al., "Novel negative Poisson's ratio behavior induced by an elastic instability", Advanced Materials, vol. 22, No. 3, 2010, pp. 1-11.

Overvelde et al., "Relating pore shape to the non-linear response of periodic elastomeric structures", Journal of the Mechanics and Physics of Solids, vol. 64, 2014, 16 pages.

Shen et al., "Simple cubic three-dimensional auxetic metamaterials", Physic. Status Solidi (B), vol. 251, No. 8, 2014, pp. 1515-1522.

Correa et al., "Negative Stiffness Honeycombs for Recoverable Shock Isolation", Rapid Prototyping Journal, vol. 21, No. 2, 2015, pp. 702-713.

Coulais et al., "Discontinuous Buckling of Wide Beams and Metabeams", Physical Review Letters, vol. 115, 2015, 7 pages.

Bickel et al., "Design and Fabrication of Materials with Desired Deformation Behavior", ACM Transactions on Graphics (TOG), vol. 29, No. 4, Jul. 2010, 10 pages.

Rosset et al., "Small, fast, and tough: Shrinking down integrated elastomer transducers", Applied Physics Reviews, vol. 3, No. 3, 2016, pp. 1-27.

Plante et al., "Large-scale failure modes of dielectric elastomer actuators", International Journal of Solids and Structures, vol. 43, 2006, pp. 7727-7751.

"Optotune DEAPs", Electroactive polymers, URL: https://www.optotune.com/technology/electroactive-polymers, 2019, 3 pages.

Product—Novasentis, "EMP Haptic Actuators for Sensory Innovation", URL: https://www.novasentis.com/product, 2019, 4 pages.

Rosset et al., "Mechanical characterization of a dielectric elastomer microactuator with ion-implanted electrodes", Sensor and Actuators A 144, 2008, 25 pages.

Gerratt et al., "Dielectric breakdown of PDMS thin films", Journal of Micromechanics and Microengineering, vol. 23, Apr. 26, 2013, 8 pages.

Hunt et al., "A self-healing dielectric elastomer actuator", Applied Physics Letters, vol. 104, 2014, 4 pages.

Skov et al., "Optimization Techniques for Improving the Performance of Silicone-Based Dielectric Elastomers", Advanced Engineering Materials, vol. 20, 2018, pp. 1-21.

Mazurek et al., "Glycerol as high-permittivity liquid filler in dielectric silicone elastomers", Journal of Applied Polymer Science, vol. 133, No. 43, 2016, 28 pages.

Rao et al., "Synthesis of flexible silica aerogels using methyltrimethoxysilane (MTMS) precursor", Journal of Colloid and Interface Science, vol. 300, 2006, pp. 279-285.

Seo et al., "Reticulated Nanoporous Polymers by Controlled Polymerization-Induced Microphase Separation", Science, vol. 336, Jun. 15, 2012, 5 pages.

Jennings, S.G., "The mean free path in air", Journal of Aerosol Science, vol. 19, No. 2, 1988, pp. 1-2.

(56) References Cited

OTHER PUBLICATIONS

Gupta et al., "Nanoemulsions: formation, properties and applications", Soft Matter, 2016, 16 pages.
Helgeson et al., "Mesoporous organohydrogels from thermogelling photocrosslinkable nanoemulsions", Nature Materials, vol. 11, Apr. 2012, pp. 344-352.
Guha et al., "Creating nanoscale emulsions using condensation", Nature Communications, vol. 8, No. 1371, Nov. 8, 2017, pp. 1-7.
Meier et al., "Microemulsion elastomers", Colloid Polymer Science, vol. 274, 1996, pp. 218-226.
Richter et al., "Design considerations of form birefringent microstructures", Applied Optics, vol. 34, No. 14, May 10, 1995, pp. 2421-2429.
Mahadik et al., "Elastic and Superhydrophobic Monolithic Methyltrimethyoxysilane-based Silica Aerogels by Two-step sol-gel process", Journal Microelectron, vol. 23, No. 1, 2016, pp. 35-39.
Non-Final Office Action received for U.S. Appl. No. 16/197,400 dated Apr. 8, 2020, 20 pages.
International Search Report and Written Opinion received for PCT Application U.S. Appl. No. PCT/IB2019/056844 dated Mar. 13, 2020, 15 pages.
Kim et al., "Enhanced oxygen detection using porous polymeric gratings with integrated recognition elements", ScienceDirect, Sensors and Actuators B, vol. 130, No. 2, Nov. 17, 2007, pp. 758-764.
Kim et al., "Tunable Porous Photonic Bandgap Structures for Chemical and Biological Sensing", Proceedings of the SPIE, vol. 6322, Article: 632201, Aug. 30, 2006, pp. 1-10.
Crawford, Gregory P., "Electrically Switchable Bragg Gratings", Optics & Photonics News, Apr. 30, 2003, pp. 54-59.
Final Office Action received for U.S. Appl. No. 16/197,400 dated Sep. 16, 2020, 20 pages.
Notice of Allowance received for U.S. Appl. No. 16/197,400 dated Mar. 24, 2021, 25 pages.
Non-Final Office Action received for U.S. Appl. No. 16/213,902 dated Jan. 21, 2021, 21 pages.
Final Office Action received for U.S. Appl. No. 16/213,902 dated Mar. 22, 2021, 17 pages.
Preinterview First Office Action received for U.S. Appl. No. 16/213,906 dated Dec. 22, 2020, 25 pages.
Final Office Action received for U.S. Appl. No. 16/213,906 dated May 17, 2021, 22 pages.
Non-Final Office Action received for U.S. Appl. No. 16/213,902 dated Jul. 2, 2021, 22 pages.

\* cited by examiner

NANOVOIDED OPTICAL STRUCTURES AND CORRESPONDING SYSTEMS AND METHODS

BACKGROUND

Augmented reality (AR) and virtual reality (VR) eyewear devices or headsets may enable users to experience events, such as interacting with people in a computer-generated simulation of a three-dimensional world or viewing data superimposed on a real-world view. AR/VR eyewear devices and headsets may also be used for purposes other than recreation. For example, governments may use such devices for military training simulations, doctors may use such devices to practice surgery, and engineers may use such devices them as visualization aids.

AR/VR eyewear devices and headsets typically include some form of optical system or device, such as an optical lens assembly configured to focus or direct light from the device's display and/or the real world to the user's eyes. Thus, there is a need for improving such optical systems.

SUMMARY

As will be described in greater detail below, the instant disclosure describes optical structures such as nanovoided antireflective (AR) and/or Bragg grating structures, and associated systems and methods. In one embodiment, an optical structure is disclosed. The optical structure may include a first optically transparent material having a first refractive index and a second optically transparent material coupled to the first optically transparent material. The second optically transparent material may define a plurality of nanovoids and may have a second refractive index that may be lower than the first refractive index. The first optically transparent material may include a polymer or an oxide. The first refractive index may be between approximately 1.4 and approximately 1.6. The second refractive index may be between approximately 1.0 and approximately 1.3.

In some aspects, the optical structure further may include a first set of additional optically transparent materials that each have a refractive index that may be substantially equal to the first refractive index, and a second set of additional optically transparent materials that each define a plurality of nanovoids and have a refractive index that may be lower than the first refractive index. In another embodiment, the optical structure may be configured to have a first average reflectance for normally incident light of a first wavelength range, the first wavelength range based at least in part on the first set of additional optically transparent materials or the second set of additional optically transparent materials. In one embodiment, the first optically transparent material may have a thickness that may be approximately a half-wavelength of a center wavelength of incident light. In another embodiment, the second optically transparent material may have a thickness that may be approximately a quarter-wavelength of a center wavelength of incident light. In one embodiment, the second optically transparent material may include a concentration of the plurality of nanovoids per unit volume that may be approximately 10% to approximately 90%.

An optical system is also disclosed. In at least one embodiment, the optical system may include an optical component and an optical structure coupled to the optical component. The optical structure may include a first optically transparent material having a first refractive index, and a second optically transparent material coupled to the first optically transparent material, the second optically transparent material defining a plurality of nanovoids and having a second refractive index that may be lower than the first refractive index.

In another embodiment, the optical component may include at least one of a refractive element, a polarizing element, or a reflective element. In one embodiment, the optical structure may be laminated to a surface of the optical component. In another embodiment, optical structure may be coupled to a surface of the optical component by an adhesive material. In one embodiment, the surface of the optical component may be convex, concave, flat, or irregular. In some embodiments, the first refractive index may be between approximately 1.4 and approximately 1.6, and the second refractive index may be between approximately 1.0 and approximately 1.3.

A corresponding method for fabricating an optical structure is also described. The method may include positioning a first optically transparent material having a first refractive index on a substrate and positioning a second optically transparent material to couple to the first optically transparent material, the second optically transparent material defining a plurality of nanovoids and having a second refractive index that may be lower than the first refractive index.

In another embodiment, the first refractive index may be between approximately 1.4 and approximately 1.6, and the second refractive index may be between approximately 1.0 and approximately 1.3. In one embodiment, the second optically transparent material may include a concentration of the plurality of nanovoids per unit volume that may be approximately 10% to approximately 90%. In another embodiment, the optical structure may be configured to have a first average reflectance for normally incident light of a first wavelength range. In one embodiment, the first optically transparent material may be configured to have a thickness that may be approximately a half-wavelength of a center wavelength of incident light, and the second optically transparent material may be configured to have a thickness that may be approximately a quarter-wavelength of a center wavelength of incident light.

While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

Features from any of the embodiments of the present disclosure may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
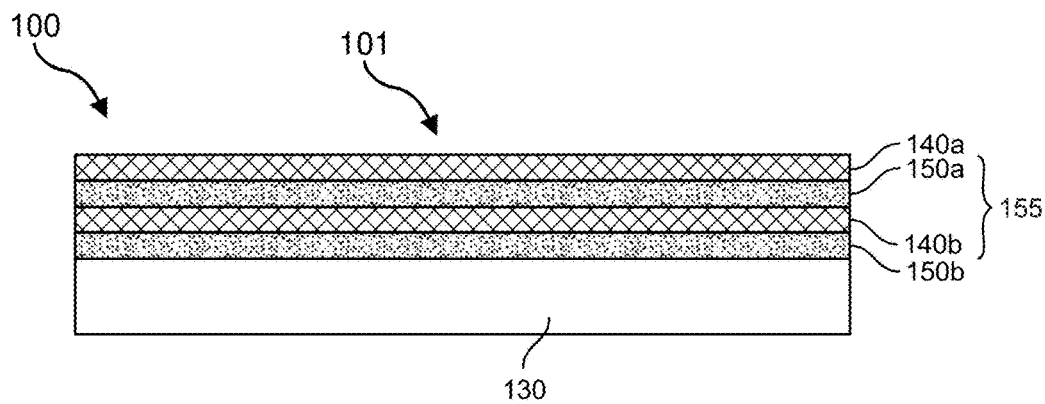
FIG. 1 shows a diagram of an optical structure, in accordance with example embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be explained in greater detail below, embodiments of the instant disclosure are generally directed to optical structures and nanovoided materials including nanovoided polymer materials, and methods and systems for manufacturing or forming such optical structures and corresponding materials.

In various embodiments, an optical structure (e.g., an antireflective (AR) structure and/or a Bragg reflector or grating) is described, which can include multiple layers (e.g., two or more layers) of high-index and low-index materials which may include nanovoids. In one embodiment, the low-index materials may have a thickness of approximately a quarter-wavelength (e.g., with respect to a center wavelength of incident light) and may include a nanovoided material. In another embodiment, the high-index material may have a thickness of a half-wavelength and may include an oxide such as hafnium oxide. The nanovoided materials including the low-index materials may include about 10% to 90% nanovoids by volume and may have an average index of refraction of about 1.05 to about 1.2 (e.g., an average index of refraction of about 1.15).

In various aspects, the optical structure or the Bragg grating may include multiple layers that can be optimized for layer count, thicknesses, and/or refractive indices to provide a reflectance below a given threshold for incident light of a predetermined angular range (e.g., normal incidence to a pre-determined off-normal angle). The optical structure or the Bragg grating may have additional layers to provide for broadband spectral reflectivity. In one embodiment, one or more of the nanovoided materials of the optical structure (e.g., the low-index of refraction materials) may be composed of a polymer. Suitable polymers include, but are not be limited to, silicone, including those based on polydimethyl siloxanes, acrylates, including polymethyl methacrylate, ethyl acrylate, butyl acrylate, di, tri, and poly functional acrylates for crosslinkers, styrenes, urethanes, imides, olefins, homopolymer, copolymers, block copolymers and combinations thereof. In an aspect, nanovoided materials used in the optical structure can be fabricated using a variety of methods including chemical vapor deposition, spin coating, and thermal evaporation.

In some aspects, the nanovoided materials that include the optical structure or the Bragg grating may have a three-dimensional structure as opposed to an extruded two-dimensional structure. Examples of extruded two-dimensional structures may include motheye low index layers and columnar structures formed by, for example, patterned sputter etching. Three-dimensional structures may have a number of advantages over two-dimensional structures, including the ability to have other coatings applied to the surface, for example thermally evaporated coatings and other deposited coatings. The three-dimensional structures may be either open cell or closed cell, or a combination thereof. Furthermore, the three-dimensional structure may be formed by applying a coating onto a two-dimensional structure in a manner such that the pores formed by the two-dimensional structure are not completely filled.

In another embodiment, the disclosed optical structure or Bragg grating can be used in connection with head-mounted displays (HMDs), for example, to reduce angular glare that may result from the user moving their head with respect to a source of ambient light. In one embodiment, a Bragg reflector may have numerous uses in applications involving the refraction of light rays (e.g., in waveguides for HMDs), to be discussed further in connection with FIG. 13, below.

The following will provide, with reference to FIGS. 1-16, detailed descriptions of systems, methods, and apparatuses for optical systems implementing electroactive devices (e.g., actuators). The discussion associated with FIGS. 1-2 includes a description of an optical structure that may be used with various embodiments. The discussion associated with FIGS. 3-4 includes a description of an electroactive device that may additionally or alternatively be used with various embodiments. The discussion relating to FIG. 5 includes descriptions of a reflectance plot for optical structures in accordance with example embodiments. The discussion associated with FIGS. 6-7 includes a description of nanovoided materials that may form part of the optical structures and may be used with various embodiments. The discussion associated with FIGS. 8-10 includes a description of fabrication systems and methods that may be used to make the optical structures and/or electroactive devices in accordance with various embodiments. The discussion associated with FIG. 11 includes a description of a lamination process that may be used to couple the optical structure to an optical structure in accordance with various embodiments. The discussion associated with FIG. 12 includes a description of an example flow that may be used to make the AR in accordance with various embodiments. The discussion relating to the embodiments depicted in FIG. 13A-15B includes descriptions of a reflectance plot for optical structures in accordance with example embodiments. The discussion relating to the embodiment depicted in FIG. 16 includes descriptions of an example near-eye-display (NED) that may incorporate the disclosed optical structure and/or electroactive devices, in accordance with example embodiments. While many of the examples discussed herein may be directed to head-worn display systems, embodiments of the instant disclosure may be implemented in a variety of different types of devices and systems.

FIG. 1 shows a diagram of an optical structure, in accordance with example embodiments of the disclosure. Diagram 100 includes an optical structure 101 in accordance with at least one embodiment. In some examples, the optical structure 101 may function as a Bragg grating and/or an antireflective (AR) structure. In one embodiment, the optical structure 101 may include an optical component 130 and one or more nanovoided materials, to be discussed. In another embodiment, the optical component 130 may include any suitable optical component, including, but not limited to, a lens, a grating, a reflector, a mirror, a polarizer, a display surface, and the like.

In some examples, the optical component 130 may include any suitable materials, such as glass and/or plastic. The optical component 130 may be, for example, a lens that may include a crown glass material, such as a borosilicate crown glass material. In another embodiment, the crown glass may include additives such as zinc oxide, phosphorus pentoxide, barium oxide, and/or fluorite and lanthanum oxide, which may alter the optical or mechanical properties of the lenses. In another example, the lens may include a plastic material. For example, the lens may include a CR-39 lens material, due to its low specific gravity and low dispersion. In another example, the lens may include a polymer, such as a urethane-based polymer. In one embodiment, the lens may include a UV-blocking material, such as polycarbonate. Furthermore, the lens may include a high-refractive-index plastic, such as thiourethanes, in which sulfur content in the polymer may tune the index-of-refraction of the plastic.

In one embodiment, the optical component 130 may include a substrate in least a portion of the optical component 130, for example, a portion that faces the optical structure 101. The substrate may include transparent materials such as sapphire or glass. In one embodiment, the substrate may include silicon, silicon oxide, silicon dioxide, aluminum oxide, an alloy of silicon and germanium, and/or indium phosphide (InP), and the like. In some embodiments, the substrate may include a semiconductor material (e.g., monocrystalline silicon, germanium, silicon germanium, SiGe, and/or a III-V based material (e.g., gallium arsenide), or any combination thereof. In various embodiments, the substrate may include a polymer-based substrate, glass, or any other bendable substrate including two-dimensional materials (e.g., graphene and molybdenum disulfide), organic materials (e.g., pentacene), transparent oxides (e.g., indium gallium zinc oxide, IGZO), polycrystalline III-V materials, polycrystalline germanium, polycrystalline silicon, amorphous III-V materials, amorphous germanium, amorphous silicon, or any combination thereof.

In another embodiment, the optical structure 101 may include a nanovoid stack 155 that includes first optically transparent materials 140*a* and 140*b* and second optically transparent materials 150*a* and 150*b*. In one embodiment, the first optically transparent materials 140*a* and 140*b* may include a nanovoided material (e.g., a polymer such as an elastomer having nanovoids), and the second optically transparent materials 150*a* and 150*b* may include a material with a substantially lower concentration of nanovoids as compared with first optically transparent materials 140*a* and 140*b*, or a material that is free or substantially free of nanovoids (e.g., a material including less 5% or less than 1% nanovoids by volume). In an aspect, the first optically transparent materials 140*a* and 140*b* may include a low-index material, and the second optically transparent materials 150*a* and 150*b* may include a high-index material. In some embodiments, while two pairs of optically transparent materials (e.g., first optically transparent materials 140*a* and 140*b* and second optically transparent materials 150*a* and 150*b*) are shown, there may be more optically transparent materials (e.g., third, fourth, fifth, etc. pairs of optically transparent materials). In some embodiments, first optically transparent materials 140*a* and 140*b* and second optically transparent materials 150*a* and 150*b* may have a thickness of approximately 1 nm to approximately 500 nm, with an example thickness of approximately 10 nm to approximately 100 nm.

In some embodiments, the first optically transparent materials 140*a* and 140*b* and second optically transparent materials 150*a* and 150*b* may be fabricated using any suitable process. For example, the first optically transparent materials 140*a* and 140*b* and second optically transparent materials 150*a* and 150*b* may be fabricated using physical vapor deposition (PVD), chemical vapor deposition (CVD), sputtering, spray-coating, spin-coating, atomic layer deposition (ALD), and the like. In another embodiment, the first optically transparent materials 140*a* and 140*b* and second optically transparent materials 150*a* and 150*b* may be manufactured using a thermal evaporator, a sputtering system, a spray coater, a spin-coater, an ALD unit, and the like.

In some embodiments, the optically transparent materials (e.g., the first optically transparent materials 140*a* and 140*b* and second optically transparent materials 150*a* and 150*b*) may include electroactive polymers and/or elastomer materials. As used herein, "electroactive polymers" may refer to polymers that exhibit a change in size or shape when stimulated by an electric field. In some examples, an "electroactive polymer" may refer to a deformable polymer that may be symmetric with regard to electrical charge (e.g., polydimethylsiloxane (PDMS) acrylates, and the like) or asymmetric (e.g., poled polyvinylidene fluoride (PVDF) or its copolymers such as poly[(vinylidenefluoride-co-trifluoroethylene] (PVDF:TrFE)).

Some electroactive polymers may find limited applications due to a low breakdown voltage of the polymers with respect to the operating voltage used by electroactive devices (e.g., reflectors) that use the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, for example, a dielectric constant ranging from approximately 2 to approximately 30.

In some embodiments, an "elastomer material" may refer to a polymer with viscoelasticity (i.e., both viscosity and elasticity) and relatively weak intermolecular forces, and generally low elastic modulus (a measure of the stiffness of a solid material) and high failure strain compared with other materials. In some embodiments, the optically transparent materials (e.g., the first optically transparent materials 140a and 140b and second optically transparent materials 150a and 150b) may include an elastomer material that has an effective Poisson ratio of less than a predetermined value (e.g., less than approximately 0.35, less than approximately 0.3, less than approximately 0.2, or less than approximately 0.1). In at least one example, the elastomer material may have an effective density that is less than a predetermined value (e.g., less than approximately 90%, less than approximately 80%, less than approximately 60%, or less than approximately 40%) of the elastomer when densified (e.g., when the elastomer is compressed, for example, by electrodes to make the elastomer denser). As noted, in some examples, the optically transparent materials (e.g., the first optically transparent materials 140a and 140b and second optically transparent materials 150a and 150b) may be nanovoided (e.g., having a plurality of nano-sized voids in the material). In some embodiments, the nanovoids may be at least approximately 10% (alternatively, at least approximately 30%, at least approximately 50%, or at least approximately 70%, at least approximately 80%, at least approximately 90%) of the volume of the optically transparent materials.

In some examples, the term "effective density" may refer to a parameter that may be obtained using a test method where a uniformly thick layer of an optically transparent material (e.g., elastomer, and/or the first optically transparent materials 140a and 140b and second optically transparent materials 150a and 150b) may be placed between two flat and rigid circular plates. In some embodiments, the diameter of the optically transparent material being compressed may be at least 100 times the thickness the optically transparent material. The diameter of the optically transparent material may be measured, then the plates may be pressed together to exert a pressure of at least approximately $1 \times 10^6$ Pa on the optically transparent material, and the diameter of the optically transparent material may be remeasured. The effective density may be determined from the following expression: D_ratio=D_uncompressed/D_compressed, where D_ratio may represent the effective density ratio, D_uncompressed may represent the density of the uncompressed optically transparent material, and D_compressed may represent the density of the uncompressed optically transparent material.

In some embodiments, the nanovoided polymer material may include particles of a material with a high dielectric constant (e.g., barium titanate). The particles may have an average diameter of between approximately 10 and approximately 1000 nm (e.g., between approximately 10 and approximately 100 nm, between approximately 20 and approximately 100 nm, and the like).

In some embodiments, some of the optically transparent materials (e.g., the first optically transparent materials 140a and 140b and second optically transparent materials 150a and 150b) may include nanovoided polymer materials that may include thermoplastic polymers. Suitable polymers may include, but are not limited to, polyolefins, such as, for example, polyethylene homopolymers and copolymers, polypropylene, polypropylene homopolymers and copolymers, functionalized polyolefins, polyesters, poly(esterether), polyamides, including nylons, poly(ether-amide), polyether sulfones, fluoropolymers, polyurethanes, and mixtures thereof. Polyethylene homopolymers include those of low, medium or high density and/or those formed by high-pressure or low-pressure polymerization. Polyethylene and polypropylene copolymers include, but are not limited to, copolymers with C4-C8 alpha-olefin monomers, including 1-octene, 1-butene, 1-hexene and 4-methyl pentene.

Other non-limiting examples of suitable olefinic polymeric compositions for use as the nanovoided polymer materials include olefinic block copolymers, olefinic random copolymers, polyurethanes, rubbers, vinyl arylenes and conjugated diener, polyesters, polyamides, polyethers, polyisoprenes, polyneoprenes, copolymers of any of the above, and mixtures thereof.

Examples of suitable copolymers for use as the nanovoided polymer materials include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), poly(methyl methacrylate) and/or polyolefin terpolymers thereof.

In some aspects, the nanovoided polymer materials may include elastomeric polymers, including styrenic block copolymers, elastomeric olefinic block copolymers, and combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), or styrene-ethylene-ethylene-propylene-styrene (SEEPS) block copolymer elastomers, polystyrene, and mixtures thereof. In one embodiment, the film may include styrene-butadiene-styrene, polystyrene, and/or mixtures thereof.

The nanovoided polymer materials may further include optional components, such as fillers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like.

In some embodiments, the optically transparent materials (e.g., the first optically transparent materials 140a and 140b and second optically transparent materials 150a and 150b) may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

As noted, in one embodiment, the optically transparent materials (e.g., the second optically transparent materials 140a and 140b) including low-index materials may have a thickness of approximately a quarter-wavelength (e.g., with respect to a center wavelength of incident light) and may include a nanovoided material. In another embodiment, the optically transparent materials (e.g., the first optically transparent materials 140a and 140b) having a high-index material may have a thickness of approximately a half-wavelength of the center wavelength of incident light. Alternatively or additionally, the optically transparent materials may each have a thickness that is approximately less than or equal to a center wavelength of incident light.

As noted, in some embodiments, the optically transparent materials (e.g., the first optically transparent materials 140a and 140b and second optically transparent materials 150a and 150b) may include particles of a material having a high dielectric constant, the particles having an average diameter between approximately 10 nm and approximately 1000 nm. In some embodiments, the material having the high dielectric constant may include barium titanate $BaTiO_3$), which is a member of the perovskite family and which may also include other titanates. Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ may be an insulator whereas upon doping it may transform into a semiconductor in conjunction with the polymer material. In some embodiments, the particles of the materials having high dielectric constant may be included in the polymer to modify a mechanical (e.g., a Poisson's ratio) or electrical property (resistance, capacitance, etc.) of the nanovoided materials.

Figure 2:
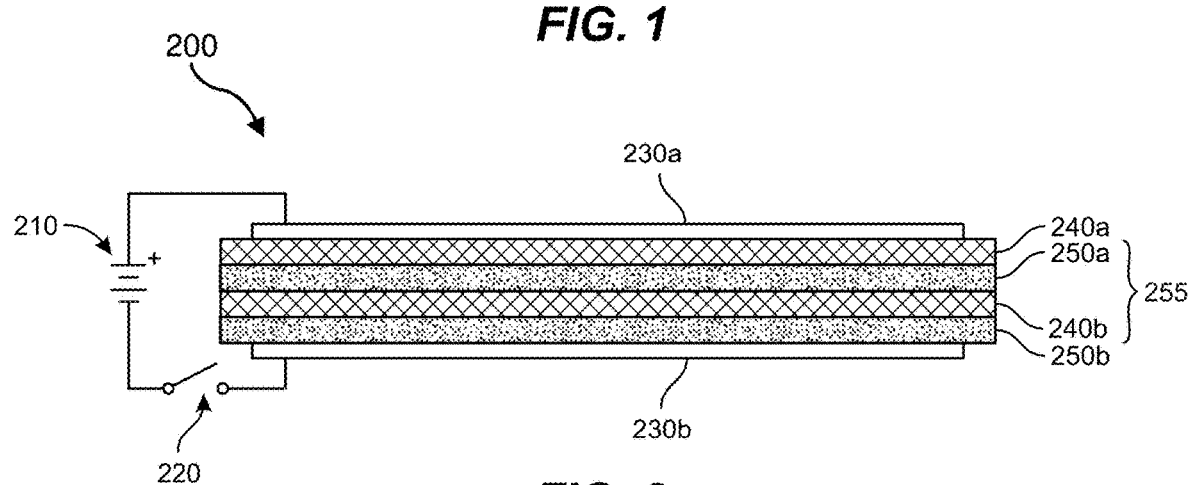
FIG. 2 shows a diagram of a switchable electroactive optical structure, in accordance with example embodiments of the disclosure.

FIG. 2 shows a diagram of an electroactive optical structure, in accordance with example embodiments of the disclosure. As shown in this figure, the electroactive optical structure may include a device 200 (e.g., a switchable Bragg grating) that may include a voltage source 210, a switch 220, a first transparent conductor 230a, and a second transparent conductor 230b. In some embodiments, the voltage source 210 may refer to a two-terminal device which may maintain a fixed voltage in an electronic circuit, activated by the switch 220. In some embodiments, the first transparent conductor 230a and the second transparent conductor 230b may sandwich layers of first optically transparent materials 240a and 240b and second optically transparent materials 250a and 250b. The operation of the electroactive optical structure is further shown and described in connection with FIGS. 4-5, below.

As noted, the first optically transparent materials 240a and 240b may include a nanovoided material (e.g., a polymer such as an elastomer having nanovoids), and second optically transparent materials 250a and 250b may include a material with a substantially lower concentration of nanovoids as compared with first optically transparent materials 240a and 240b or a material that is free or substantially free of nanovoids (e.g., a material including less 5% or less than 1% nanovoids by volume). In another embodiment, a nanovoid stack 255 may include the first transparent conductor 230a, the second transparent conductor 230b, the first optically transparent materials 240a and 240b, and the second optically transparent materials 250a and 250b. In some embodiments, while two pairs of optically transparent materials (e.g., first optically transparent materials 240a and 240b and second optically transparent materials 250a and 250b) are shown, there may be more optically transparent materials (e.g., third, fourth, fifth, etc. pairs of optically transparent materials).

In various embodiments, the first transparent conductor 230a and/or the second transparent conductor 230b may be configured in any suitable manner. For example, in some embodiments, the first transparent conductor 230a and/or the second transparent conductor 230b may be formed from a thin film of electrically conductive and semi-transparent material, such as indium tin oxide (ITO). In some implementations, alternatives to ITO may be used, including transparent conductive oxides (TCOs), including widerspectrum TOCs, conductive polymers, metal grids, carbon nanotubes (CNT), graphene, nanowire meshes, and thinmetal films. Additional TCOs may include doped binary compounds, such as aluminum-doped zinc-oxide (AZO) and indium-doped cadmium-oxide. Moreover, TCOs may include barium stannate and metal oxides, such as strontium vanadate and calcium vanadate. In some implementations, conductive polymers may be used. For example, a poly(3, 4-ethylenedioxythiophene) poly(styrene sulfonate) (PEDOT:PSS) layer may be used. In another example, a poly (4,4-dioctyl cyclopentadithiophene) material doped with iodine or 2,3-dichloro-5,6-dicyano-1,4-benzoquinone (DDQ) may be used. The example polymers and similar materials may be spin-coated in some example embodiments.

Further, the first transparent conductor 230a and/or the second transparent conductor 230b may include any suitable material such as electrically conductive materials suitable for use in thin-film electrodes, such as, for example, aluminum, silver, indium, gallium, zinc, carbon black, and/or any other suitable materials formed by vacuum deposition, spray, adhesion, and/or any other suitable technique. In some embodiments, the first transparent conductor 230a and/or the second transparent conductor 230b may be self-healing, such that damage from local shorting of a circuit may be isolated. Suitable self-healing electrodes may include thin films of metals, such as aluminum. In some configurations, it may be necessary for the first transparent conductor 230a and/or the second transparent conductor 230b to stretch elastically. In such embodiments, the first transparent conductor 230a and/or the second transparent conductor 230b may include TCOs, graphene, carbon nanotubes, and the like. In some embodiments, the first transparent conductor 230a and/or the second transparent conductor 230b may have a thickness of approximately 1 nm to approximately 500 nm, with an example thickness of approximately 10 nm to approximately 100 nm. In one embodiment, the first transparent conductor 230a and/or the second transparent conductor 230b may be designed to allow healing of electrical breakdown (e.g., the electric breakdown of the nanovoided materials).

In some embodiments, the first transparent conductor 230a and/or the second transparent conductor 230b may be fabricated using any suitable process. For example, the first transparent conductor 230a and/or the second transparent conductor 230b may be fabricated using PVD, CVD, sputtering, spray-coating, spin-coating, ALD, and the like. In another embodiment, the first transparent conductor 230a and/or the second transparent conductor 230b may be manufactured using a thermal evaporator, a sputtering system, a spray coater, a spin-coater, an ALD unit, and the like.

As noted, in some embodiments, the optically transparent materials (e.g., the first optically transparent materials 240a and 240b and second optically transparent materials 250a and 250b) may include electroactive polymers and/or elastomer materials. Some electroactive polymers may find limited applications due to a low breakdown voltage of the polymers with respect to the operating voltage used by electroactive devices (e.g., reflectors) that use the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, for example, a dielectric constant ranging from approximately 2 to approximately 30.

Figure 3:
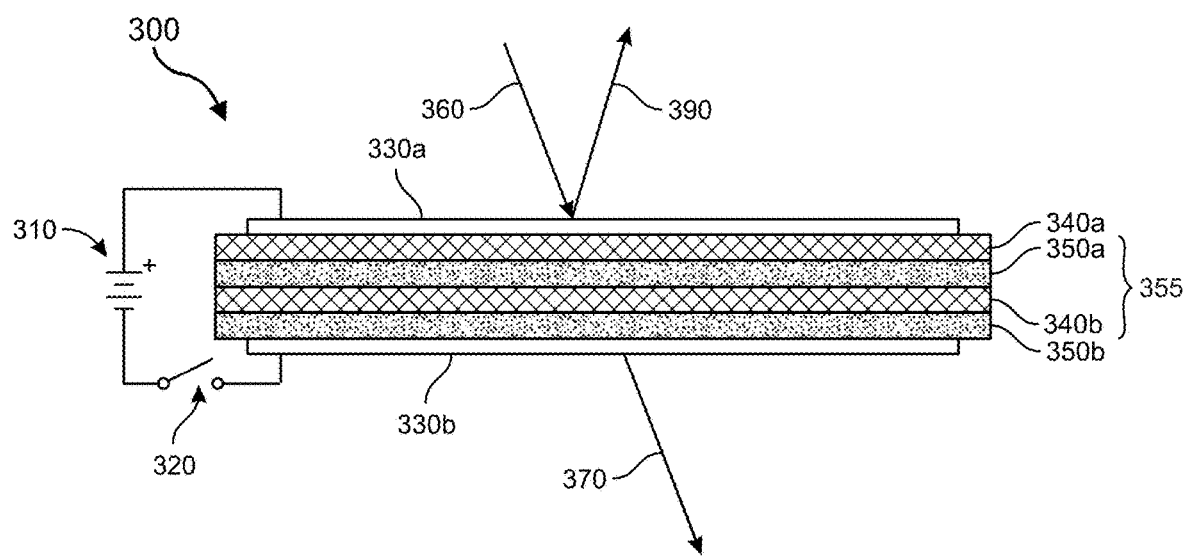
FIG. 3 shows another diagram of a switchable electroactive optical structure in an open-switch state, in accordance with example embodiments of the disclosure.

FIG. 3 shows a diagram of an electroactive optical structure, in accordance with example embodiments of the disclosure. As shown in this figure, the electroactive optical structure may include a device 300 (e.g., a switchable Bragg grating) that may include a voltage source 310, an open switch 320, a first transparent conductor 330a, and a second transparent conductor 330b. In some embodiments, the voltage source 310 may refer to a two-terminal device which may maintain a fixed voltage in an electronic circuit. In some embodiments, the first transparent conductor 330a and the second transparent conductor 330b may sandwich layers of first optically transparent materials 340a and 340b and second optically transparent materials 350a and 350b.

In one embodiment, the first optically transparent materials 340a and 340b may include a nanovoided material (e.g., a polymer such as an elastomer having nanovoids), and second optically transparent materials 350a and 350b may include a material with a substantially lower concentration of nanovoids as compared with first optically transparent materials 340a and 340b, or a material that is free or substantially free of nanovoids (e.g., a material including less 5% or less than 1% nanovoids by volume). In another embodiment, a nanovoid stack 355 may include the first transparent conductor 330a, the second transparent conductor 330b, the first optically transparent materials 340a and 340b, and the second optically transparent materials 350a and 350b.

In some embodiments, a light ray 360 may be incident on the nanovoid stack 355; moreover, the light ray 360 may be partially transmitted, forming transmitted ray 370, and/or partially reflected, forming reflected ray 390. In some embodiments, while two pairs of optically transparent materials (e.g., first optically transparent materials 340a and 340b and second optically transparent materials 350a and 350b) are shown, there may be more optically transparent materials (e.g., third, fourth, fifth, etc. pairs of optically transparent materials). In some embodiments, light rays may be partially transmitted and/or partially reflected in a similar manner from an optical structure that does not include transparent conductors, such as optical structure 101 in FIG. 1.

Figure 4:
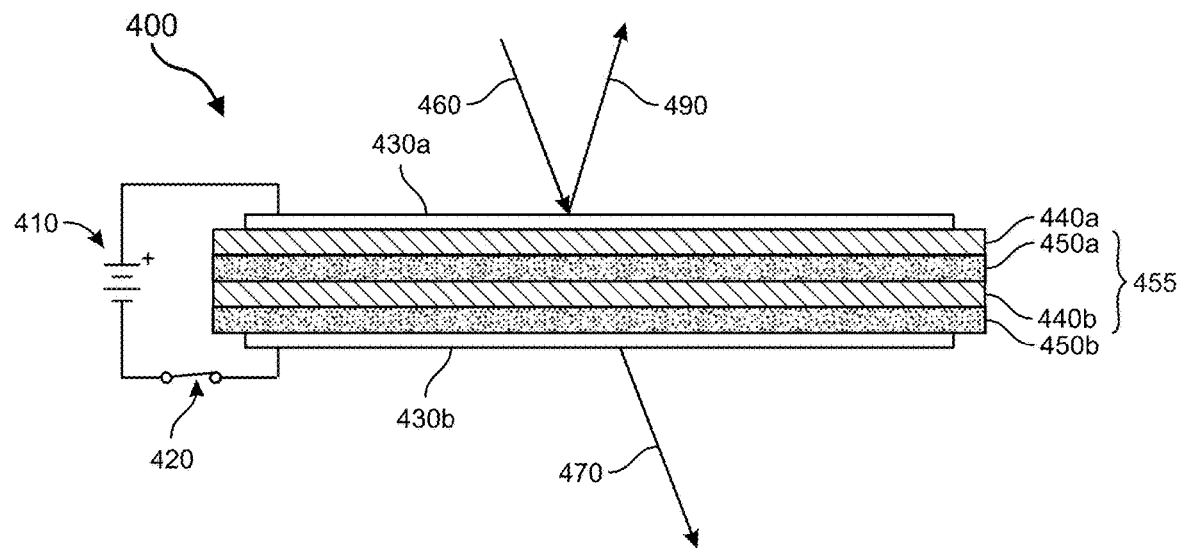
FIG. 4 shows another diagram of a switchable electroactive optical structure in a closed-switch state, in accordance with example embodiments of the disclosure.

FIG. 4 shows a diagram of an electroactive optical structure that includes a device 400 (e.g., a switchable Bragg grating) in a closed-switch state, in accordance with example embodiments of the disclosure. In particular, FIG. 4 shows a voltage difference (e.g., a positive voltage) being applied by a voltage source 410 when switch 420 is in a closed stated, the voltage source 410 being connected via wires to a first transparent conductor 430a and a second transparent conductor 430b of the device 400. As with device 300 illustrated in FIG. 3, first transparent conductor 430a and the second transparent conductor 430b of device 400 shown in FIG. 4 may sandwich layers of first optically transparent materials 440a and 440b and second optically transparent materials 450a and 450b, forming nanovoid stack 455. First optically transparent materials 440a and 440b may include a nanovoided material (e.g., a polymer such as an elastomer having nanovoids), and second optically transparent materials 450a and 450b may include a material with a substantially lower concentration of nanovoids as compared with first optically transparent materials 440a and 440b, or a material that is free or substantially free of nanovoids.

In some embodiments, the voltage difference between the first transparent conductor 430a and the second transparent conductor 430b may cause the nanovoid stack 455 to mechanically compress in comparison to the nanovoid stack 355 (see, e.g., device 300 in the open-switch state as shown in FIG. 3), increasing the average refractive index of the nanovoided layers (i.e., first optically transparent materials 440a and 440b) of the nanovoid stack 455 in comparison to nanovoid stack 355. In particular, the compression of the nanovoid stack 455 may reduce the average refractive index difference between the compressed first optically transparent materials 440a and 440b and the compressed second optically transparent materials 450a and 450b as compared to the average refractive index difference between the first optically transparent materials 340a and 340b and the second optically transparent materials 350a and 350b in the open-switch 320 state of FIG. 3, as discussed above. In some embodiments, the reduced index difference between the compressed first optically transparent materials 440a and 440b and the compressed second optically transparent materials 450a and 450b may substantially reduce the fraction of light ray 460 that is reflected (e.g., reflected ray 490) by the nanovoid stack 455 of FIG. 4 in comparison to the fraction of light ray 360 reflected by the nanovoid stack 355 of FIG. 3. In various examples, in comparison to nanovoid stack 355 of FIG. 3, a greater portion of light ray 460 may be transmitted through nanovoid stack 455, forming transmitted ray 470 as shown in FIG. 4.

As noted, when the nanovoids are compressed, the index difference between the nanovoided layers (i.e., the first optically transparent materials 440a and 440b) and the non-nanovoided or substantially non-nanovoided layers (i.e., second optically transparent materials 450a and 450b) of the device may be reduced; however, the optical pathlength (e.g., the product of the geometric length of the path light follows through the layers of the nanovoid stack 455, and the index of refraction of the layers of the nanovoided stack 455 through which the light propagates) may not change substantially in comparison to nanovoid stack 355 in FIG. 3, and accordingly, the peak reflection (e.g., the wavelength of maximal reflectivity) for the device 400 may also not change substantially during the compression of the nanovoid stack 455. For example, if the device 400 is compressed by a factor of two relative to the device 300 of FIG. 3, the refractive index may approximately double while the thickness of the layers of the nanovoid stack 455 may be reduced by half. Accordingly, the optical pathlength of the device may remain the same or substantially the same. In contrast, in a device without compressible nanovoids, if the index of refraction changes while the thickness of the layers remains approximately the same or is reduced by less than half, the optical pathlength may change and, accordingly, the peak wavelength of the device may shift.

In some embodiments, the application of a voltage to the electroactive nanovoid stack 455 may change the internal pressure of gases or liquids in the nanovoided regions of the compressed first optically transparent materials 440a and 440b, which may include electroactive polymers defining the compressed nanovoided regions. For example, gases or liquids may diffuse either into or out of the electroactive polymers during dimensional changes associated with its deformation. Such changes in the electroactive polymers may affect, for example, the hysteresis of an electroactive device (e.g., device 400) incorporating the electroactive polymer during dimensional changes, and also may result in drift when the electroactive polymer's dimensions are rapidly changed. Accordingly, in an embodiment, the nanovoids may be filled with a gas to suppress electrical breakdown of the electroactive polymers (for example, during deformation). In another embodiment, the gas may include sulfur hexafluoride, fluorocarbon gases (e.g., 3M NOVEC 4710 insulating gas, available from 3M Company, Maplewood, Minn., USA), or any suitable gas.

In another embodiment, the device 400 may have a sealing layer (not shown) applied to the edges of the device 400, or to one or more of the transparent conductors (e.g., first transparent conductor 430a or second transparent conductor 430b) or a combination thereof. Suitable sealing layers may include thin film layers of an inorganic material, such as silica, applied with any suitable method, for example, ALD, PVD, CVD, or the like. Sealing of the edges of the device 400 may be done after the nanovoided materials are filled with gas. Suitable methods for filling the nanovoided materials may include removing the solvent, either under vacuum, within a supercritical fluid such as supercritical $CO_2$, or by aging the material in a desired gas, such as air, sulfur hexafluoride or fluorocarbons. Vents may be incorporated into the thin film coatings during the deposition process, such as by adding a shadow mask, or vents may be added later by etching, decomposing, or ablating an array of holes, lines, or other shapes into the optical structure after or during deposition. The thin film layers may also be made from one or more dyads of a polymer layer and an inorganic layer. In an embodiment, the sealing layer may also include a barrier material such as polychlorotrifluoroethylene (PCTFE) or other polymer applied by solvent or with initiated-CVD.

The thin film layers may also be made from one or more dyads of a polymer layer and an inorganic layer. In an embodiment, the sealing layer may also include a barrier material such as polychlorotrifluoroethylene (PCTFE) or other polymer applied by solvent or with initiated-CVD (iCVD).

Figure 5:
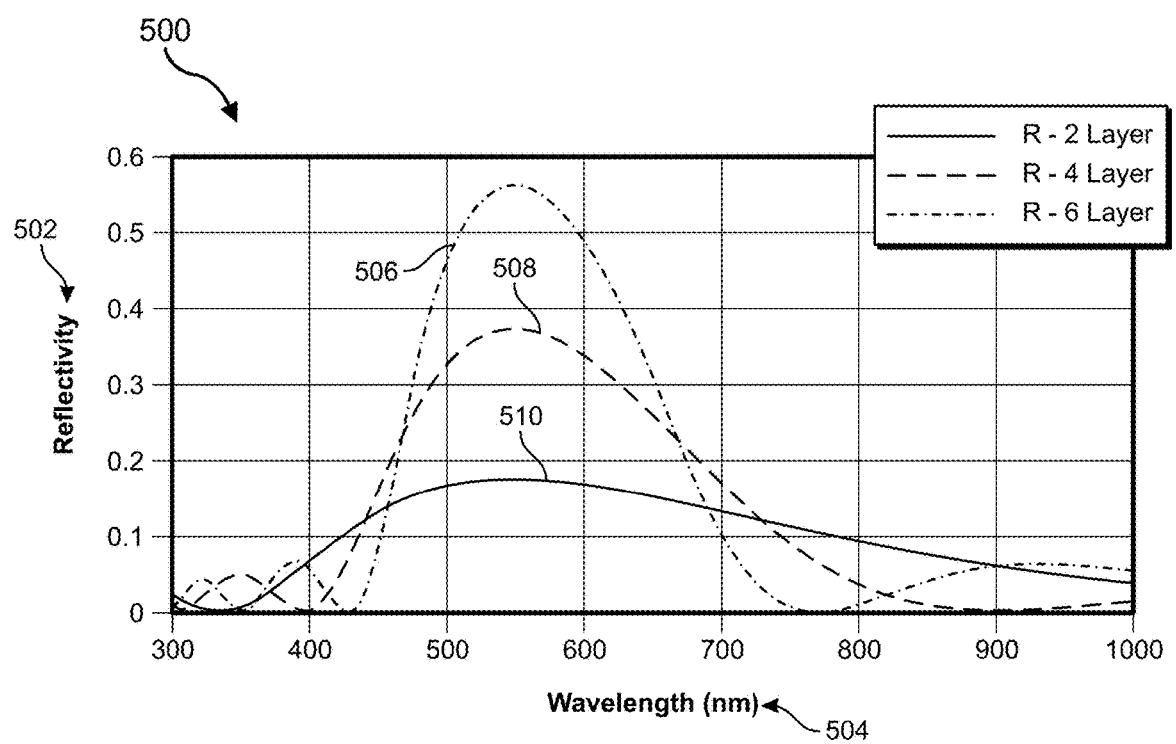
FIG. 5 shows a plot of reflectivity versus wavelength of an optical structure, in accordance with example embodiments of the disclosure.

FIG. 5 shows a plot of reflectivity of a switchable optical structure including a switchable Bragg grating versus wavelength, in accordance with example embodiments of the disclosure. In particular, plot 500 shows simulations of the reflectivity 502 of Bragg grating versus wavelength 504 including a Bragg grating having four-layers 508, that is, having two pairs of optically transparent materials (e.g., similar to the optical structure 100 shown and described in connection with FIG. 1). Plot 500 also shows the reflectivity of a switchable Bragg grating having two layers 506 (e.g., one pair of optically transparent materials) and a switchable Bragg grating having six layers 510 (e.g., three pairs of optically transparent materials).

In some embodiments, the layers of the switchable Bragg grating shown in plot 500 may include layers that alternate between a relatively high refractive index material and a relatively low refractive index material. For example, the high refractive index materials may include poly(methyl methacrylate) (PMMA) having a refractive index of approximately 1.49. Further, the low index materials may include a nanovoided material, such as, for example, a crosslinked polymer having an uncompressed refractive index of approximately 1.15.

In some embodiments, the layers that are included in the switchable Bragg grating that are characterized by plot 500 may be deposited on a silica substrate. In some embodiments, backside reflections may not be considered in the simulations of plot 500. Further, the layer order of an electroactive device that is simulated and characterized by plot 500 may include a silica substrate, an optically transparent nanovoided layer, an optically transparent PMMA layer, a second optically transparent nanovoided layer, and a second optically transparent PMMA layer. In another embodiment, a PMMA layer (e.g., the second PMMA layer) may serve as the outermost layer of the layer stack. The nanovoided layers may be approximately 120 nm thick, and the PMMA layers may be approximately 92 nm thick.

In some embodiments, the reflectivity of the switchable Bragg grating may drop as the stacks are mechanically compressed (e.g., via application of a voltage). For example, the reflectivity may change from an initial level to approximately zero when the compressed nanovoided layers (e.g., the PMMA layers) have the same index as the compressed layers having fewer nanovoids or no nanovoids (e.g., the crosslinked polymer layers).

As noted, the substrate may include a silica substrate with no backside reflection (e.g., to ensure that the reflection diagram is due to the Bragg grating materials themselves and not the substrate). In some embodiments, for a two-layer device (e.g., corresponding to plot 506), including a high-index layer followed by a low-index layer, a reflectivity of about 18% may be obtained at the design wavelength of approximately 550 nanometers. For a four-layer device (e.g., corresponding to plot 508), the reflectivity at 550 nanometers may be approximately 35%, and for a six-layer device (e.g., corresponding to plot 510), the reflectivity at 550 nanometers may be approximately 55%. In some embodiments, relatively thin, multilayer devices with a small number of layers may have a significant amount of reflectivity. This may be at least partially due to a low refractive index of the nanovoided material. Further, the reflectivity of the multilayer devices may be proportional to the square of the difference of the refractive indices of the layers. In some embodiments, devices may include a high-index layer of PMMA having a refractive index of approximately 1.49. In another embodiment, for a fixed low-index layer, devices including a high-index layer including materials with a refractive index of approximately 1.6-1.65 (e.g., using an acrylate) may be used to obtain a larger reflection as compared with devices having a high-index layer of PMMA.

In some embodiments, plot 500 may represent the reflectivity of an electroactive device when the device is in an inactive state (e.g., with zero applied voltage). In another embodiment, as noted, when a voltage is applied to the device, the reflectivity of the device may have a value approaching approximately zero, depending on the degree of nanovoid compression. For example, if the voids were compressed nearly 100%, then the reflectivity may go to approximately zero. In another example, if the voids are compressed to approximately 80%, the reflectivity may ordinarily not approach zero in comparison with the device with nanovoids that are compressed nearly 100%. In some embodiments, one way to obtain a reflectivity approaching zero for a device that has its nanovoids compressed less than approximately 100% (e.g., approximately 80%) may be to increase the refractive index of the host matrix of the nanovoided layer (e.g., polymer layer) such that the refractive index of the host matrix is higher than a predetermined amount (e.g., based on the materials, size of the nanovoids, thickness of the layers, refractive index, etc.) with respect to the refractive index of the non-nanovoided material.

In some embodiments, compressing the nanovoided layers may increase the index of refraction of the nanovoided layers. Accordingly, when the device is off (e.g., when the device does not have an applied voltage), the stack of nanovoided and non-nanovoided layers in the device may be reflective at least because the nanovoided layers are at a lower index of refraction as compared with the non-nanovoided layers. When the device is activated (e.g., the stack of nanovoided and non-nanovoided layers are compressed by applying a voltage to the device), the refractive index of the nanovoided layers may increase to match or nearly match the refractive index of the non-nanovoided layers.

In some embodiments, the bandwidth of the electroactive device (e.g., the Bragg reflector) may include a range of wavelengths from approximately 400 nanometers to approximately 700 nanometers. In another embodiment, the bandwidth of the device may be a function of the change in the refractive indices between the high-index layer(s) and the low-index layer(s) of the device. Accordingly, the larger the difference between the refractive indices between the nanovoided layers and non-nanovoided layers of the device, the broader the bandwidth of the device. In another embodiment, a narrow bandpass filter may be fabricated using (i) a multilayered device having a relatively high number of layers (e.g., an integer number of layers such as 6, 8, 10, 12, 14, etc.), and (ii) a device having a small refractive index difference between the refractive indices of the high-index layers and low-index layers.

In another embodiment, the bandwidth of the device may be tuned by fabricating a device having layer thicknesses that are varied in a gradient manner. For example, layers on the substrate and near the substrate may be thicker than the remaining layers may be fabricated to be progressively thinner in comparison. Moreover, the index difference between the multi-layer stack including the thicker and thinner layers may be designed to be relatively small such that the bandwidth of the device is tuned to cover the visible spectrum.

In some example embodiments, an electroactive device as described herein may include a stack of from two optically transparent materials including electroactive nanovoided materials and corresponding transparent conductors to thousands of optically transparent materials (e.g., from 2 optically transparent materials to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, greater than approximately 2000 optically transparent materials).

Figure 6:
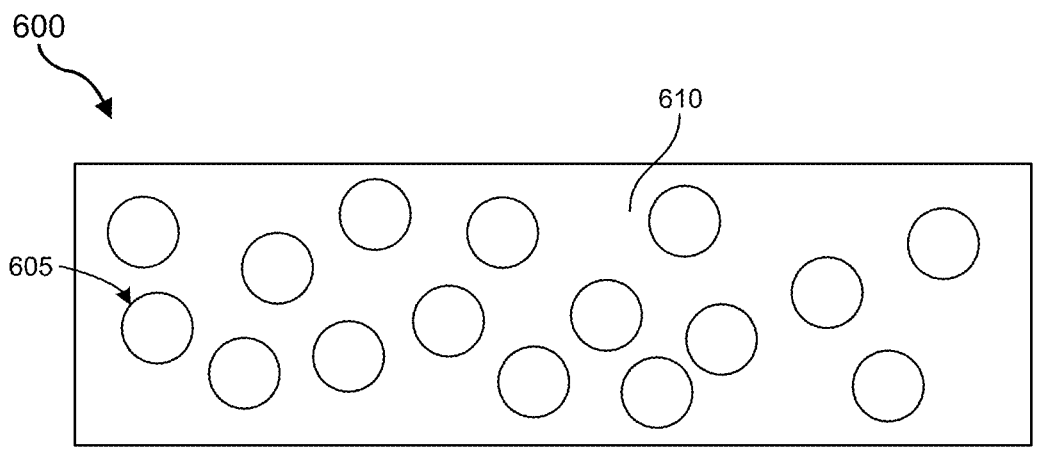
FIG. 6 illustrates aspects of the formation of nanovoids in a material (e.g., a polymer) used in an optical structure, in accordance with example embodiments of the disclosure.

Diagram 600 in FIG. 6 illustrates aspects of the formation of nanovoids in a material 610 (e.g., a polymer), in accordance with example embodiments of the disclosure. In some embodiments, the material 610 may be included in the optical structures described above (e.g., the optical structure 101 of FIG. 1). In another embodiment, a material precursor such as a monomer may be deposited with a solvent, and the monomer and solvent may be cured leading to the separation of the solvent and the formation of the nanovoids 605 in the material 610.

In some embodiments, the nanovoids may occupy at least approximately 10% (e.g., approximately 10% by volume, approximately 20% by volume, approximately 30% by volume, approximately 40% by volume, approximately 50% by volume, approximately 60% by volume, approximately 70% by volume, approximately 80% by volume, approximately 90% by volume) of the volume of the nanovoided material. The voids and/or nanovoids may be either closed- or open-celled, or a mixture thereof. If they are open-celled, the void size may be the minimum average diameter of the cell. In some embodiments, the nanovoided material may include a thermoset material and/or any other suitable material.

The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the voids may be between approximately 10 nm and approximately 1000 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

Figure 7:
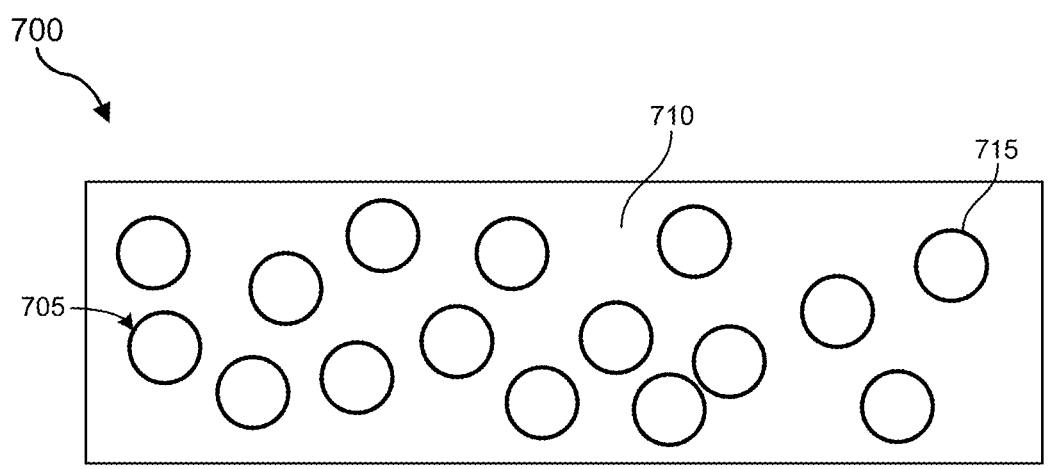
FIG. 7 shows a diagram illustrating aspects of a nanovoided material that may be used in an optical structure, the nanovoided material using a B-stage polymer for the formation of nanovoids and where the nanovoids may be coated, in accordance with example embodiments of the disclosure.

FIG. 7 shows a diagram 700 illustrating aspects of a nanovoided material 710 formed using, for example, a B-stage polymer (also referred to as B-stage epoxy or partially cured epoxy and/or polymer) for the formation of nanovoids 705, where the nanovoids may be coated, as will be described. In another embodiment, the nanovoided material 710 may be used in the optical structures described herein (e.g., the optical structure 100 shown and described in connection with FIG. 1, above). To form the nanovoids 705 in the nanovoided material 710, two monomers may be mixed. Further, a first monomer may be cured by a first source of radiation (e.g., UV light), while another monomer may be cured by a second source of radiation (e.g., heat or x-rays). Further, when the first monomer is cured to form a polymer, the polymer may exclude the second monomer along with the solvent and thereby form nanovoids 705, which may include solvent and/or the second monomer internally.

As noted, two different sources of radiation may be used to generate the nanovoided material 710 for B-stage epoxies.

In an example system, a first monomer may include a free-radical initiated monomer which may be activated (e.g., polymerized) by UV light, while a second monomer may include a different monomer type, such as an epoxy, that is unaffected by the first type of radiation (e.g., UV light). Moreover, the second monomer may be cured by a second type of radiation, such as heat. Accordingly, when the first monomer, second monomer, and solvent are mixed, the first monomer and second monomer may both dissolve in the solvent. The mixture may then be irradiated with a first type of radiation (e.g., UV light) such that the first monomer begins to polymerize and form a first polymer. The solvent and the second monomer regions that surround the polymerizing first monomer may be excluded from polymerizing first monomer, leading to the formation of partially formed nanovoids. Further, excluded regions that include the solvent and second monomer may remain inside the partially formed nanovoids. When heat is further applied to the partially formed nanovoids, the solvent may start evaporating and the second monomer may coat the inside of the partially formed nanovoids, leading to the formation of the nanovoids 705 shown in FIG. 7. Accordingly, the nanovoids 705 may not move; rather the material (e.g., the second monomer and/or solvent) in the partially formed nanovoids may evaporate and the second monomer and/or the solvent may coat the interiors of the nanovoids 705. The second monomer (e.g., an epoxy) may then be polymerized to form polymer layers 715 that include a second polymer coating the interiors of the nanovoids 705 defined in the nanovoided material 710.

Moreover, because the different polymers (e.g., a first polymer and a second polymer) respectively formed from the first and second monomers may have different indices of diffraction and/or different mechanical properties, more sophisticated nanovoided materials may be formed using the B-stage epoxies and associated processes. For example, it may be possible to generate nanovoided materials 710 that have switchable reflectivity without the need to completely compress the nanovoids 705 to generate the switching effect with high efficiency. This may be done by keeping the nanovoids 705 from fully collapsing at least in part due to different mechanical properties of the nanovoids 705, or of a polymer (e.g., the second polymer) coating the interior surfaces of the nanovoids 705, as compared with the polymer matrix (e.g., the first polymer) in which they are formed.

In some embodiments, the nanovoids (e.g., nanovoids 605 and/or 705) may contain a compressible fluid (e.g., air). In another embodiment, once the solvent separates from the curable material to form the nanovoids during the fabrication of the nanovoided material, the nanovoided material may be dried and the solvent may be replaced by a compressible fluid (e.g., air). In another embodiment, when pressure is applied to the nanovoided materials, the voids may not be fully eliminated as there may still be compressed fluid (e.g., air) in the voids. In another embodiment, the voids may be further reduced in volume by compression; for example, by forming nanovoids that have an open-cell structure. Accordingly, the compressible fluid may be able to at least partially diffuse into the compressed matrix upon compression of the nanovoided material (e.g., as further shown and described in connection with FIG. 4).

Figure 8:
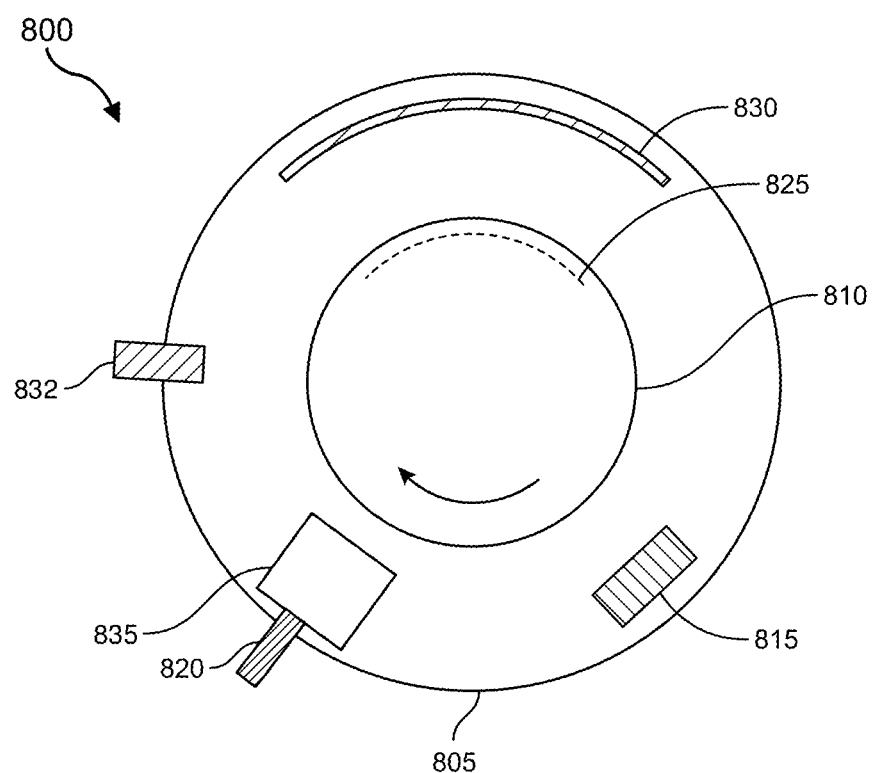
FIG. 8 shows a diagram including an apparatus that may be used for making an optical structure, in accordance with example embodiments of the disclosure.

FIG. 8 shows a diagram including an apparatus that may be used for making an optical structure such as a Bragg grating, in accordance with example embodiments of the disclosure. In particular, the apparatus 800 may include a vacuum-based deposition apparatus including an enclosure (alternatively referred to as chamber) 805, a rotating drum 810, a heat source 825, an optional condenser 830, an optional source 815, a fluid source 820, and a curing source 832. As will be elaborated on further below, a device (e.g., a switchable Bragg grating) may be fabricated by alternating (i) depositions of solvent and a nanovoid matrix material (e.g., acrylate), (ii) heating away the solvent to create the nanovoided regions, and (iii) pumping in the nanovoid matrix material (e.g., acrylate) with no solvent. In various embodiments, a method may include (i) condensing a first vapor on a substrate and applying radiation to the substrate to form a first layer, the first vapor including mixture of a first curable material, an initiator, and a solvent, (ii) condensing a second vapor on the first layer and applying radiation to the substrate to form a second layer having a first refractive index, the second vapor including a second curable material, and (iii) removing the solvent from the first layer to form a nanovoided layer having a second refractive index that may be greater than the first refractive index.

In some embodiments, the fluid source 820 may include be a fluid that may have both a monomer (e.g., acrylic acid) and an optional crosslinking agent (e.g., trimethylolpropane triacrylate, TMPTA). In some examples, "monomer" may refer to a monomer that forms a given polymer (i.e., as part of an optically transparent material). In another embodiment, the fluid from the fluid source 820 may flow into an evaporator 835, creating vapor of the monomer and crosslinker. This vapor may condense on a surface on the rotating drum 810 to form a first optically transparent material 140a (see, e.g., FIG. 1). Subsequent layers (e.g., second optically transparent materials 150a and 150b, and second optically transparent material 140b of FIG. 1) of the stack (e.g., nanovoid stack 155 of FIG. 1) may be similarly generated. Between depositions of layers or after deposition of two or more layers, the partially or fully fabricated electroactive device (e.g., switchable Bragg reflector) may be cured by the curing source 832. Further, after the deposition of the nanovoid stack, the device may be coated with a material by an optional source 815. For example, the optional source may apply a metal coating and/or a metal oxide coating, or combinations thereof (e.g., serving as a second transparent conductor), as discussed above. In some embodiments, there may be more than one optional source in addition to optional source 815.

In some embodiments, the apparatus 800 may use shadow masks to control the patterns of deposited materials to form an electroactive device. In some embodiments, the chamber 805 may be evacuated (e.g., using one or more mechanical vacuum pumps to a predetermined level such as $10^{-6}$ Torr or below). The chamber 805 may include a rigid material (e.g., steel, aluminum, brass, glass, acrylic, and the like). As noted, FIG. 8 shows an embodiment where the apparatus 800 may include a rotating drum 810. In some embodiments, the rotation of the rotating drum 810 may generate centrifugal energy and cause the deposited material to spread more uniformly over any underlying sequentially deposited materials (e.g., electrodes, optically transparent materials, and the like) that are mechanically coupled to the rotating drum 810. Alternatively, the rotating drum 810 may be configured to be fixed in position and the deposition and curing systems (e.g., monomers in the fluid source 820 and heat source 825, the optional source 815, and/or curing source 832) may be moving, or both the rotating drum 810 and the deposition and curing systems may be moving simultaneously.

In some embodiments, the curing source 832 may include an energized array of filaments or other radiation source that may generate actinic energy to initiate reaction between the monomers, monomer initiators, and/or cross-linking agents.

In some examples, "actinic energy" may refer to energy capable of breaking covalent bonds in a material. Examples may include electrons, electron beams, x-rays, gamma rays, ultraviolet and visible light at appropriately high energy levels, and ions. Additionally or alternatively, the heat source 825 may generate heat to initiate reaction between the monomers, monomer initiators, and/or the cross-linking agents. The monomers, monomer initiators, and/or cross-linking agents may react upon heating and/or actinic exposure to form optically transparent materials (e.g., first optically transparent material 140*a* in FIG. 1, etc.).

In some embodiments, an exhaust port (not shown) of the chamber 805 may open to release at least a portion of the vapor in chamber 805 between one or more depositions of the materials (e.g., monomers, crosslinking agents, conductive materials, etc.). In another embodiment, chamber 805 may be purged (e.g., with a gas or the application of a vacuum, or both), to remove a portion of the vapor (e.g., monomers, crosslinking agents, initiators, metal particles, and any resultant byproducts). Thereafter one or more of the previous steps may be repeated (e.g., for a second optically transparent material 150*a* in FIG. 1, etc.), as described above. In this way, individual layers of an electroactive device may be maintained at high purity levels.

In some embodiments, the deposition of the materials (e.g., monomers, crosslinking agents, conductive materials, etc.) of the device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more transparent conductors, optically transparent materials, and the like). Frequently, volatile byproducts are also produced, which may be removed by gas flow through the chamber 805.

As noted above, a flowable material (e.g., a solvent) may be combined with the curable materials (e.g., monomers) to create a flowable mixture that may be used for producing optically transparent materials including electroactive polymers (e.g., elastomers) with nanovoids. In some embodiments, the flowable material may be combined (e.g., mixed) with the curable material (e.g., monomers). In some embodiments, the curable material itself may be combined with at least one non-curable component (e.g., particles of a material having a high dielectric constant and/or initiators) to form a mixture including the curable material and the at least one non-curable component. Alternatively, the flowable material (e.g., solvent) may be introduced into the fluid source 820 to deposit (e.g., via vaporization using an evaporator 835 or, in alternative embodiments, via printing) the curable material onto the conductor. In some embodiments, the flowable material (e.g., solvent) may be deposited as a separate layer either on top of or below a curable material (e.g., a monomer), and the solvent and curable material may be allowed to diffuse into each other before being cured by the curing source 832 and/or heat source 825 to generate an optically transparent material having nanovoids. In some embodiments, after the curable material is cured, the solvent may be allowed to evaporate before another optically transparent material or another conductor is formed. In some embodiments, the evaporation of the solvent may be accelerated by the application of actinic energy by curing source 832, by application of heat to the substrate (not shown) by heat source 825, or by reducing the pressure of the solvent above the substrate using a condenser 830 (e.g., a device that condenses vapors into a liquid or solid), or a combination thereof. Isolators (not shown) may be added to the apparatus 800 to prevent, for example, the solvent vapor from interfering with the curing source 832, the condenser 830, or the optional source 815.

Figure 9:
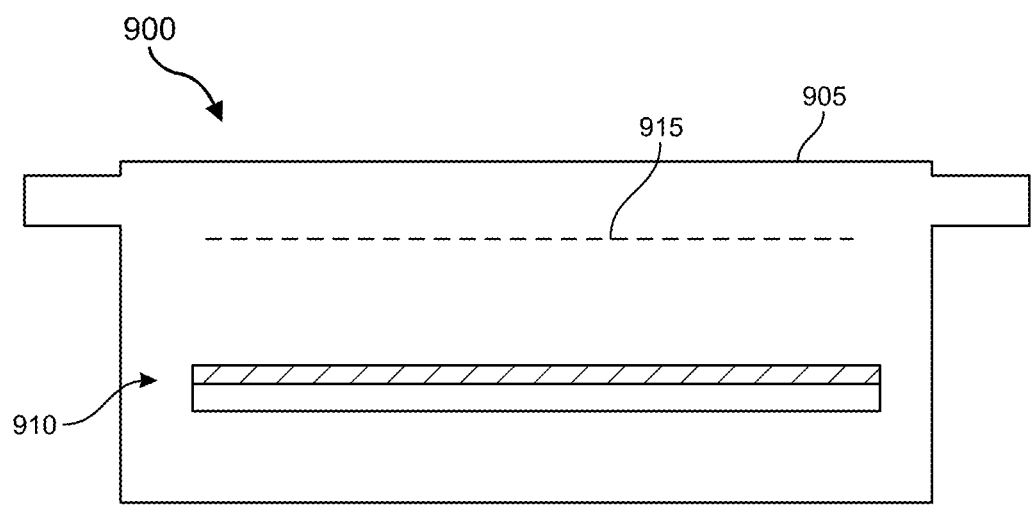
FIG. 9 shows another diagram including an apparatus that may be used for making an optical structure, in accordance with example embodiments of the disclosure.

FIG. 9 shows another diagram of an example apparatus for the fabrication of the devices, in accordance with example embodiments of the disclosure. In particular, diagram 900 shows an apparatus 905 that may perform an initiated chemical vapor deposition (CVD) process. In another embodiment, in iCVD, an electric cooler (not shown) may be used to cool a substrate 910, and a mixture of, for example, an acrylate and a solvent vapor may be flowed into apparatus 905. This mixture may pass through an array of heated elements 915 that may be located in an upper portion of the apparatus 905. In at least one embodiment, the heated elements 915 may be heated to an elevated temperature, such as, for example, about 200° C., which may trigger an initiator. The substrate 1010 may be concurrently cooled to a temperature below that of the heated elements. Accordingly, a mixture of solvent and monomer may condense on the surface of the substrate 910, where it may be cured. Alternatively or additionally, multiple layers of monomer and solvent-monomer mixture may be alternately deposited. The layers may be stacked through, for example, sequential deposition, and the solvent may be removed (e.g., through evaporation by heating) to generate a nanovoided structure. In another embodiment, relatively precise control of the temperature of the substrate and the multilayer deposited structure may be used to generate a high-quality switchable device. For example, active cooling may be used. In at least one embodiment, Henry's law may be used to infer that minor fluctuations of the low-pressure environment (e.g., the pressure of the chamber) will likely not substantially affect the vapor pressure of the solvent and may therefore not negatively impact the quality, structure, and/or uniformity of the nanovoided materials.

In some embodiments, the apparatus 905 may apply an atmospheric pressure CVD (APCVD) coating formation technique (e.g., CVD at atmospheric pressure). In another embodiment, the apparatus 905 may apply a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one embodiment, the apparatus 905 may apply an ultrahigh vacuum CVD (UHVCVD) process (e.g., CVD at very low pressure, typically below approximately $10^{-6}$ Pa (equivalently, approximately $10^{-8}$ torr)).

In some embodiments, the apparatus 905 may apply an aerosol assisted CVD (AACVD) process (e.g., a CVD in which the precursors are transported to the electroactive device) by means of a liquid/gas aerosol, which may be generated ultrasonically. In some embodiments, AACVD may be used with non-volatile precursors.

In some embodiments, the apparatus 905 may apply a direct liquid injection CVD (DLICVD) process (e.g., a CVD in which the precursors are in liquid form, such as, for example, a liquid or solid dissolved in a solvent). Liquid solutions may be injected in the apparatus 905 towards one or more injectors. The precursor vapors may then be transported to the electroactive device as in CVD. DLICVD may be used on liquid or solid precursors, and high growth rates for the deposited materials may be reached using this technique.

In some embodiments, the apparatus 905 may apply a hot wall CVD process (e.g., CVD in which the chamber of the apparatus 905 is heated by an external power source and the electroactive device is heated by radiation from the heated wall of the chamber). In another embodiment, the apparatus 905 may apply a cold wall CVD process (e.g., a CVD in which only the materials forming the electroactive device are directly heated, for example, by induction, while the walls of the chamber are maintained at room temperature).

In some embodiments, the apparatus 905 may apply a microwave plasma-assisted CVD (MPCVD) process, where microwaves are used to enhance chemical reaction rates of the precursors for forming the electroactive device. In another embodiment, the apparatus 905 may apply a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the resulting electroactive device or in depositing certain materials (e.g., organic materials and/or some polymers).

In some embodiments, the apparatus 905 may apply a remote plasma-enhanced CVD (RPECVD) process. In some embodiments, RPECVD may be similar to PECVD except that the materials for forming the electroactive device may not be directly in the plasma discharge region. In some embodiments, removal of the materials for forming the electroactive device from the plasma region may allow for the reduction of processing temperatures down to room temperature.

In some embodiments, the apparatus 905 may apply an atomic-layer CVD (ALCVD) process. In some embodiments, ALCVD may deposit successive layers of different substances to produce an electroactive device that includes layered, crystalline film coatings.

In some embodiments, the apparatus 905 may apply a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (e.g., a monolayer) to several micrometers in thickness) and nanomaterials, which may be used in forming the electroactive device.

In some embodiments, the apparatus 905 may apply a hot filament CVD (HFCVD) process, which may also be referred to as catalytic CVD (cat-CVD) or initiated CVD (iCVD), as noted above. In some embodiments, this process may use a hot filament to chemically decompose the source gases to form the materials of the electroactive device. Moreover, the filament temperature and temperature of portions of materials for forming the electroactive device may be independently controlled, allowing colder temperatures for better adsorption rates at the electroactive device, and higher temperatures necessary for decomposition of precursors to free radicals at the filament.

In some embodiments, the apparatus 905 may apply a hybrid physical-chemical vapor deposition (HPCVD) process. HPCVD may involve both chemical decomposition of precursor gas and vaporization of a solid source to form the materials of the electroactive device.

In some embodiments, the apparatus 905 may apply metalorganic chemical vapor deposition (MOCVD) process (e.g., a CVD that uses metalorganic precursors) to form materials of the electroactive device.

In some embodiments, the apparatus 905 may apply a rapid thermal CVD (RTCVD) process. This CVD process may use heating lamps or other methods to rapidly heat the materials forming the electroactive device. Heating only materials deposited on a substrate on which the electroactive device is formed rather than undeposited precursors or chamber walls may reduce unwanted gas-phase reactions that may lead to particle formation in the electroactive device.

In some embodiments, the apparatus 905 may apply a photo-initiated CVD (PICVD) process. This process may use UV light to stimulate chemical reactions in the precursor materials used to make the materials for the electroactive device. Under certain conditions, PICVD may be operated at or near atmospheric pressure.

In some embodiments, while various CVD processes are generally described above, the various materials described herein (e.g., the curable materials, the non-curable materials, the conductive materials, and/or any additional materials and layers may be disposed (e.g., on a substrate) in any suitable manner. As noted, a substrate may generally refer to any material (e.g., a layer) on which another layer or element is formed. In another embodiment, various materials for forming the electroactive device may be printed (e.g., via inkjet printing, silkscreen printing, etc.). In some aspects, inkjet printing may refer to a type of computer printing that operates by propelling droplets of material onto a substrate (e.g., a flexible or inflexible substrate). In another embodiment, silkscreen printing may refer to a printing technique whereby a mesh is used to transfer a material (e.g., curable material and/or non-curable material) onto a substrate (e.g., a flexible or inflexible substrate), except in areas made impermeable to the material by a blocking stencil. A blade or squeegee may be moved across the screen to fill the open mesh apertures with the material, and a reverse stroke may then cause the screen to touch the substrate momentarily along a line of contact. This may cause the material to wet the substrate and be pulled out of the mesh apertures as the screen springs back after the blade has passed. In one embodiment, the materials may be vaporized (e.g., via thermal evaporation, CVD, PVD, and/or the like), as described above. In at least one embodiment, materials for forming the device may be disposed (e.g., on a substrate) using a co-flow process and/or a roll-to-roll process. In some embodiments, monomers (or oligomers, prepolymers, and/or other pre-cursor materials) for forming electroactive polymer materials may optionally be mixed with a solvent and the solvent may be removed from the electroactive polymer during and/or following curing to form nanovoids within the electroactive polymer.

Figure 10:
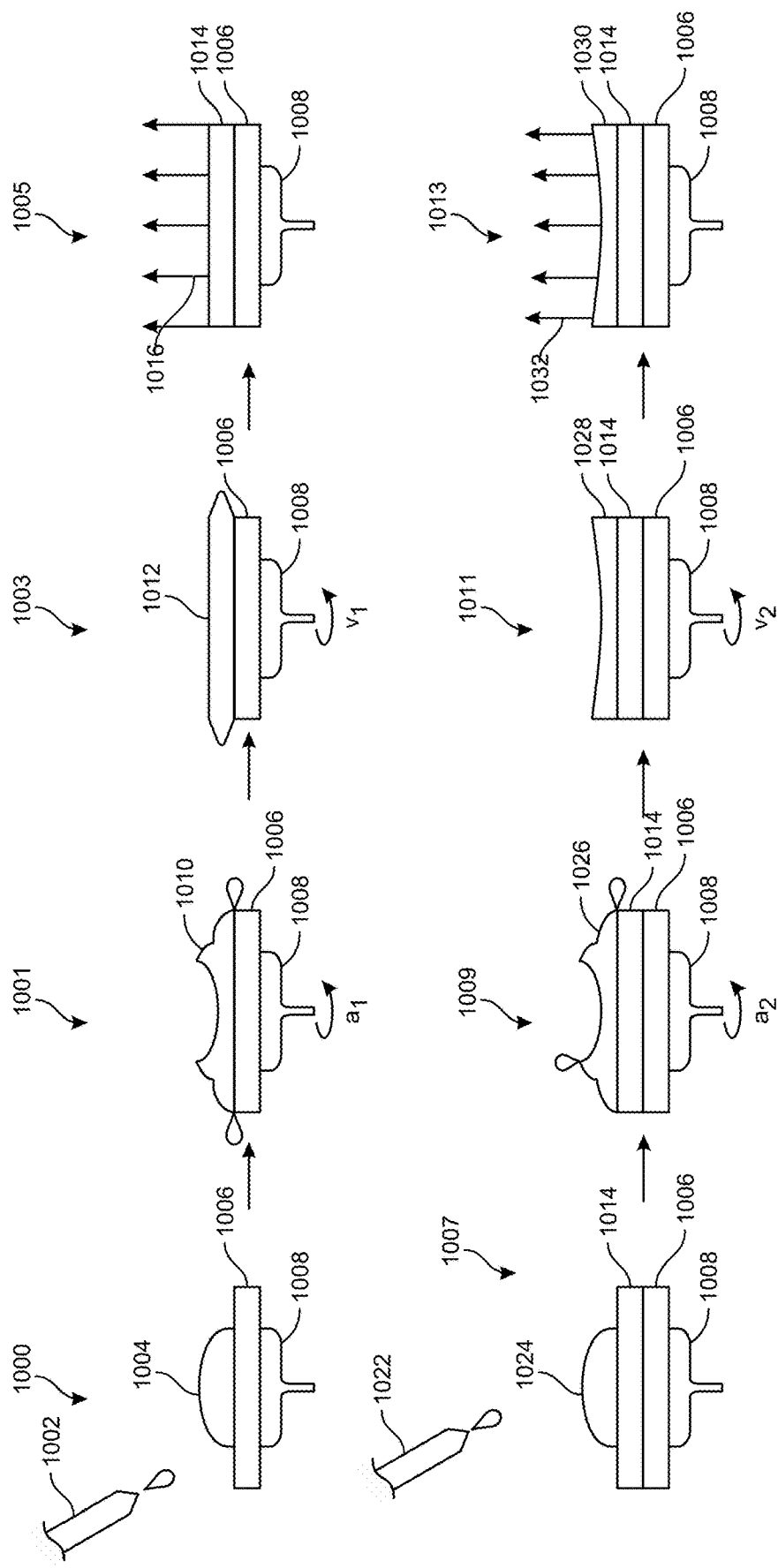
FIG. 10 shows yet another diagram including an apparatus that may be used for making an optical structure, in accordance with example embodiments of the disclosure.

FIG. 10 shows diagrams illustrating an example formation process of an optical structure, in accordance with example embodiments of the disclosure. In particular, diagram 1000 of FIG. 10 shows an example spin-coating process for the fabrication of an optical structure. In some aspects, the spin coating process can, for example, include multiple steps that include different concentrations of monomers to solvent, different spin-speeds, or different annealing times/temperatures). In some examples, "monomer" may refer to a monomer that forms a given polymer (i.e., as part of an optically transparent material). In some example embodiments, an optical structure may be generated using this spin-coating process. In another embodiment, the optical structure may include anywhere from two nanovoided materials to thousands of optically transparent materials (e.g., from 2 nanovoided materials to approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, greater than approximately 2000 nanovoided materials.)

In particular, diagram 1000 shows a substrate 1006 having a rotational axis through the center of the substrate 1006 and perpendicular to its surface. In some embodiments, the substrate 1006 may be rotated about its rotational axis at an angular velocity (which may be expressed in revolutions per minute, RPM). Moreover, the configuration and suitable equipment for performing the process described in connection with FIG. 10 may be used for spin coating (e.g., a process whereby as the substrate 1006 is rotated, centrifugal force may accelerate a fluid 1004 deposited on the substrate 1006 across the substrate 1006 surface from the substrate's center towards the substrate's edge). The fluid 1004 may include a liquid such as a photoresist, a solvent, a monomer, a dielectric, an adhesive, a conductor, combinations thereof, and/or any other suitable material. In some embodiments, the fluid 1004 may include a volatile component and a nonvolatile component. In addition to liquids, the fluid 1004 may include a gas, a spray, a supercritical fluid, and/or the like. In some aspects, the fluid 1004 may include a first concentration of monomer to solvent. Further fluids may be dispensed at later stages (e.g., fluid 1022), which may have a second concentration of monomer to solvent, that is different than the first concentration. In such a way, a multilayer index gradient optical structure may be fabricated, as described below.

The substrate 1006 may include any suitable material having a radius, R, which may be designed to match the radius of an optical component (e.g., a compound retarder, a reflective polarizer, a partial reflector, and the like). In at least one embodiment, the radial location on the substrate 1006 may be described by the variable r, wherein $0 \leq r \leq R$.

In various embodiments, as shown in diagram 1000, the fluid 1004 may be deposited on the substrate 1006. In one embodiment, the fluid 1004 may be dispensed from a fluid source 1002, which may be positioned over the center of a stationary substrate 1006. In other embodiments, the fluid 1004 may be dispensed at another location on the substrate 1006 with or without rotation.

After dispensing a suitable volume of fluid 1004 (as shown and described in connection with diagram 1000), the substrate 1006 may be rotated at a first angular acceleration, a1, causing a similar rotation of the fluid 1004 to a rotating fluid 1010 (as shown in diagram 1001). This may cause a portion of the rotating fluid 1010 to be pushed off of the surface of the substrate 1006, thereby reducing the amount of rotating fluid 1010 that is in contact with the surface substrate 1006. Moreover, as shown in diagram 1003, the substrate 1006 may then be rotated at a first angular velocity, v1, that may further cause a constant velocity rotation of the rotating fluid 1012 and may also cause another portion of the rotating fluid 1012 to be pushed off of the surface of the substrate 1006, thereby further reducing the amount of rotating fluid 1012 that is in contact with the surface substrate 1006. In some embodiments, the fluid may include a volatile and a nonvolatile component. In another embodiment, as centrifugal forces spin the fluid 1012, the volatile component may evaporate, thereby leaving a film of the nonvolatile component.

In diagram 1005, the rotating fluid 1012 of diagram 1003 may then be brought to a stop to yield a first layer 1014 over the substrate 1006, and the resulting the first layer 1014 may have a substantially uniform thickness. In another embodiment, the fluid of the first layer 1014 may be left to sit or may be heated up (e.g., via radiation, not shown); this may further allow the volatile component to evaporate 1016 from the first layer 1014 thereby leaving a film of the nonvolatile component. Moreover, the fluid 1004 may include a cross-linking component, and the application of radiation to the first layer 1014 may cause the cross-linking component to harden the first layer 1014. In some aspects, the first layer 1014 may be heated to a first temperature that may be different than subsequent layers (e.g., second layer 1030), to be discussed further below, which may be used to generate an optical structure having different concentrations of nanovoids in the different layers, as shown and described in connection with FIGS. 1-4, above.

As illustrated in diagram 1007, the fluid source 1022 may then be repositioned from the center of the substrate 1006 to a first radial location, r1. In various embodiments, another fluid 1024 may be disposed using the fluid source 1022, and the fluid 1024 may include the same or a similar fluid as fluid 1004 or a different fluid than fluid 1004, which is shown and described in connection with diagram 1000. In some examples, fluid 1024 may also include a liquid such as a photoresist, a monomer, a dielectric, an adhesive, a conductor, combinations thereof, and/or any other suitable material. In some embodiments, the fluid 1024 may include a volatile component and a nonvolatile component. In addition to liquids, the fluid 1024 may be a gas, a spray, a supercritical fluid, and/or the like.

As shown in diagram 1009, after dispensing the fluid 1024 onto the first layer 1014, the substrate 1006 may be accelerated at a second angular acceleration, a2. The acceleration may include a step change in rotation, or it may change more smoothly. In some embodiments, the first, second, and/or subsequent angular acceleration may be unequal, but this is not necessarily so. Further, the second angular acceleration may cause a similar rotation of the fluid 1024 to a rotating fluid 1026, as shown in diagram 1009, such that a portion of the rotating fluid 1026 may be pushed off of the surface of the first layer 1014, thereby reducing the amount of rotating fluid 1026 that is in contact with the surface of the first layer 1014.

Moreover, as shown in diagram 1011, the substrate 1006 may then be rotated at a second angular velocity, v2, that may further cause a constant velocity rotation of the rotating fluid 1028 and may also cause another portion of the rotating fluid 1028 to be pushed off of the surface of the first layer 1014, thereby further reducing the amount of rotating fluid 1028 that is in contact with the surface of the first layer 1014. In some embodiments, the fluid may include a volatile component and a nonvolatile component. As centrifugal forces spin up the rotating fluid 1028, at least a portion of the volatile component may evaporate thereby leaving a film of the nonvolatile component.

In diagram 1013, the rotating fluid 1028 of diagram 1011 may be brought to a stop to yield a second layer 1030 over the first layer 1014, where the second layer 1030 may have a non-uniform thickness. In at least one embodiment, the fluid of the second layer 1030 may be left to sit or may be heated up (e.g., via radiation, not shown); this may further allow the volatile component to evaporate 1032 from the second layer 1030 thereby leaving a film of the nonvolatile component. Moreover, the fluid 1022 may include a cross-linking component, and the application of radiation to the second layer 1030 may cause the cross-linking component to harden the second layer 1030. As noted, the temperature used to heat the second layer 1030 may be different than the temperature used to heat the first layer 1014, which may yield different concentrations of nanovoids in the nanovoided material.

In some aspects, there may be substantially none of the second layer 1030 formed inside of an annular region defined by the fluid source 1022. That is, the region covered by the first layer 1014 may include an area defined by $0 \leq r \leq R$, and the region covered by the second layer 1030 may include an area defined by $r1 \leq r \leq R$.

The process illustrated in FIG. 10 may be repeated any number of times. For example, after repositioning the fluid source (e.g., fluid source similar to fluid source 1022) to a second radial location, r2, the substrate 1006 may be accelerated to a third angular velocity, thereby forming a third layer (not shown) over the substrate 1006. In at least one embodiment, the region covered by the third layer may be given by $r2 \leq r \leq R$. Accordingly, by following the process illustrated in FIG. 10, a non-uniform film may be formed over a substrate. In some embodiments, the non-uniform film may have a radial, or lateral, thickness gradient.

Further, embodiments described above may also include processing parameters such as temperature, spin speed, monomer to solvent concentration, and/or incremental movements of the fluid source. In one embodiment, the movement of the fluid source combined with a corresponding rotation scheme may produce an optical structure that has at least one layer having a lateral thickness gradient that may be stepwise continuous. Other embodiments may include ramped parameter transitions to produce a layer that includes a linear thickness gradient. In at least one embodiment, the layer thickness may increase from the center of the layer to the edge of the layer.

In some embodiments, additional processing parameters during formation of one or more layers may include angular acceleration, rotation velocity, rotation duration or period, dispensing flow rate, dispensing location, distance of the fluid source from the substrate, and/or the like. In other embodiments, the rotation may be held constant for one or more dispensing steps. Still other embodiments may include clockwise and/or counterclockwise rotations.

For example, a first dispensing step (for example, as was shown and described in connection with diagram 1000) may include accelerating a substrate clockwise to a first rotational velocity. The next step may include maintaining the first rotational velocity for a first period. It may thereafter be accelerated to a second rotational velocity. In an embodiment, the second rotational velocity may be opposite the first rotational velocity. The magnitudes of the first and second velocities may be the same or different.

The series of steps may further include one or more periods of no rotation. For example, a series of steps may include a period of clockwise rotation, a period of no rotation, and a period of either clockwise or counterclockwise rotation. In other embodiments, a clockwise rotation step may proceed substantially instantaneously to a counterclockwise rotation, with no pause between rotations. Rotational pauses or velocity changes may occur before, during, or after the dispensing of the fluid. In an embodiment, the duration of acceleration periods and constant rotation periods, may, for example, be up to several minutes, less than approximately 60 seconds, and/or less than approximately 10 seconds. Rotational velocities up to 3000 rpm, or greater, may be included in some embodiments.

In another embodiment, the fluids (e.g., fluid 1002 and/or 1022) may be applied onto the substrate by conventional coating techniques such as spin-coating or blade coating. The fluids may also be applied to the substrate by conventional printing techniques, including, but not limited to, screen printing, offset printing, roll-to-roll printing, letter press printing, gravure printing, rotogravure printing, flexographic printing, intaglio printing, pad printing, heat-seal printing, ink-jet printing or printing by means of a stamp or printing plate.

In one embodiment, polymerization may be achieved by exposing the polymerizable material to heat or actinic radiation. Actinic radiation may include irradiation with light (e.g., UV light, IR light or visible light), irradiation with X-rays or gamma rays, or irradiation with high energy particles, such as ions or electrons. In another embodiment, a single UV lamp or a set of UV lamps may be used as a source for actinic radiation. When using a high lamp power, the curing time may be reduced. Another possible source for actinic radiation may include a laser (e.g., a UV, IR or visible laser).

In various aspects, the curing time of the polymerizable material may depend on the reactivity of the formulation, the thickness of the coated layer, the type of polymerization initiator and the power of the UV lamp. The curing time may, for example, be approximately less than 5 minutes, less than 3 minutes, or less than 1 minute. In another embodiment, short curing times of less than 30 seconds may be used for mass production.

In one embodiment, the polymerization process may not be limited to a single curing step. Rather it may be possible to carry out polymerization by two or more steps, in which the film is exposed to two or more lamps of the same type, or two or more different lamps in sequence. The curing temperature of different curing steps may be the same or different. The lamp power and dose from different lamps may also be the same or different. In one embodiment, the polymerization may be carried out in air; however, polymerizing in an inert gas atmosphere like nitrogen or argon may also be possible.

Figure 11:
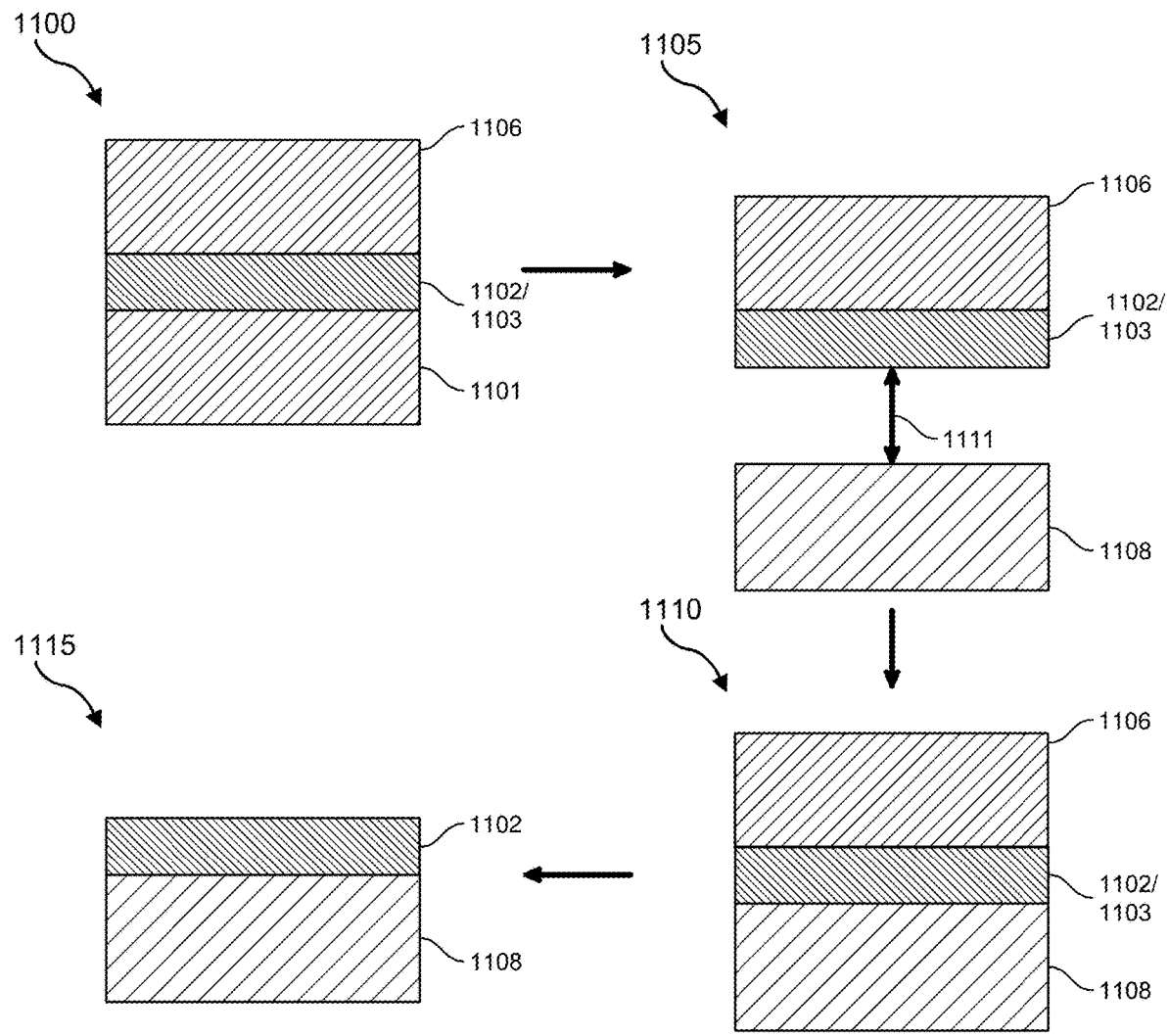
FIG. 11 shows a diagram of an example method of using an optical structure, in accordance with example embodiments of the disclosure.

FIG. 11 shows a diagram of an example method of using an index gradient optical structure, in accordance with example embodiments of the disclosure. In some embodiments, the protected optical structure 1100 may include a first removable material 1101 (e.g., a peelable material), an optical structure 1102 that may include a buffer material 1103, and a second removable material 1106. In particular, the first removal material 1101 and the second removable material 1106 may serve to protect the optical structure 1102 from external elements (dust, debris, etc.) and may allow the optical structure 1102 to be coupled to a surface of an optical component.

In another embodiment, the first removable material 1101 may include viscoelastic polymers with their rheology tuned to the desired bonding and de-bonding characteristics needed. In another embodiment, the first removable material 1101 may include acrylate polymer, rubber (either natural rubber or synthetic thermoplastic elastomer, silicone rubber), and/or the like. In another embodiment, these materials may be blended with a tackifier to produce tack (e.g., a term that may refer to the grabbing power of the first removable material 1101) at room temperature, may be somewhat deformable, may have low surface energy, and/or may be moisture resistant. Further, the materials may have a low cross-linking density, low viscosity ($\eta < 10{,}000$ cP), and/or may have broad molecular weight distribution to enable deformation of the adhesive material to the rough surface of an underlying substrate under various temperatures and peel conditions.

In one embodiment, the protected optical structure 1100 may optionally include a buffer material 1103. In one embodiment, the buffer material 1103 may provide a planarization or passivation to the surface of the optical component that the optical structure 1102 is ultimately laminated on. In an embodiment, the buffer material 1103 may include any suitable material. For example, the buffer material 1103 may include a polyolefin-based resin such as polypropylene, polymethylpentene, and/or a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, or acrylic-based resin). In one embodiment, the buffer material 1103 may be thicker than the optical structure. In another embodiment, if the buffer material 1103 is thin, the laminate including the buffer material 1103 and the optical structure 1102 may be curled due to cure shrinkage of a resin constituting the optical structure 1102.

In another embodiment, the interface between the first removal material 1101 and the buffer material 1103 and/or the optical structure may include an adhesive layer (not shown). In one embodiment, the adhesive layer may be made of any material. To the face of the adhesive layer opposite to the face where the buffer material 1103 is provided, a separator film (e.g. polyethylene terephthalate (PET), not shown) for protection of the adhesive layer may be adhered.

In various embodiment, any suitable adhesive may be used. For example, the adhesive may be a self-assembled monolayer, a pressure sensitive adhesive (PSA), a standard reactive adhesive, or the like. Self-assembled monolayer adhesives may use a silane coupling agent including an alkoxysilane and a reactive functional group. The silane coupling unit may covalently react with a glass substrate and the reactive functional group may react with the nanopatterned index gradient structure. Examples of silane coupling agents may include, for example, 3-glycidoxypropyltrimethoxysilane, (2-aminoethyl)aminopropyltriethoxysilane, aminopropyltrimethoxysilane, aminopropyltriethoxysilane, (2-aminoethyl)aminopropylmethyldimethoxysilane, methacyryloxypropylmethyltrimethoxysilane, ethacyryloxypropyltrimethoxysilane, glycidoxypropyltrimethoxysilane, mercaptopropyl trimethoxysilane, vinyltriacetoxysilane, chloropropyltrimethoxysilane, vinyltrimethoxysilane, octadecyldimethyl-[3-(trimethoxysilyl)-propyl]ammonium chloride, mercaptopropyl-methyl-dimethoxysilane, isocyanatopropyltriethoxysilane, (3-acryloxypropyl)trimethoxysilane, and the like.

PSAs may be polymeric materials applied between two layers for forming a bond with the desired cohesive strength upon application of a light pressure. A primary mode of bonding for a pressure sensitive adhesive may not be chemical or mechanical, but rather may be a polar attraction of an adhesive to a given material. Pressure sensitive adhesives may be designed with a balance between flow and resistance to flow. The bond may form because the adhesive may be soft enough to flow or wet the substrate. The bond may have strength because the adhesive may be hard enough to resist flow when stress is applied to the bond. Once the adhesive and the substrate are in proximity of each other, additional molecular interactions occur, such as, for example, Van der Waals' forces, capillary forces and the like, or combinations thereof, which may provide a significant contribution to the strength of the bond.

When peeled from a surface (e.g., when removed from the buffer material 1103), the adhesive may demonstrate a clean peel, cohesive splitting, delamination and the like, or combinations thereof. The rate of bond formation may be determined by the conditions under which the adhesive contacts a surface and may be controlled by the surface energy of the adhesive, the surface energy of the substrate, and the viscosity of the adhesive. Cohesion is the property of a pressure sensitive adhesive that allows it to resist shear stress. Cohesion may further be a measure of an adhesive's internal bond strength. Good cohesion may be necessary for a clean peel. In an embodiment, the adhesive layer may include a material that has a first index of refraction that is substantially similar to at least one of an index of refraction of an optical component (e.g., a retarder, a polarizer, a mirror, a lens, and the like) or an index of refraction of the optical structure 1102.

In one embodiment, the protected structure 1100 may include a second removable material 1106 (e.g., a peelable material). FIG. 11 shows a diagram of an example method of using an optical structure 1102, in accordance with example embodiments of the disclosure. In another embodiment, the protected structure 1100 may include a second removable material 1106 (e.g., a peelable material). In another embodiment, the second removable material 1106 may include viscoelastic polymers with their rheology tuned to the desired bonding and de-bonding characteristics needed. In another embodiment, the second removable material 1106 may include acrylate polymer, rubber (either natural rubber or synthetic thermoplastic elastomer, silicone rubber), and/or the like. In another embodiment, these materials may be blended with a tackifier to produce tack (e.g., a term that may refer to the grabbing power of the second removable material 1106) at room temperature, may be somewhat deformable, may have low surface energy, and/or may be moisture resistant. Further, the materials may have a low cross-linking density, low viscosity ($\eta$<10,000 cP), and/or may have broad molecular weight distribution to enable deformation of the adhesive material to the rough surface of an underlying substrate under various temperatures and peel conditions.

In various aspects, FIG. 11 illustrates aspects of the attachment of the optical structure 1102 to a substrate 1108. In some embodiments, the first removable material 1101 may be removed from the protected structure 1100, to reveal a surface of the buffer material 1103 (or if the buffer material 1103 is not included in the protected structure 1100, a surface of the index gradient optical structure 1102). Thereafter, the surface of the buffer material 1102 may be coupled 1111 (e.g., laminated, pressure laminated, etc.) onto a surface of the substrate 1108, thereby yielding a semi-protected structure 1110, as shown in FIG. 11.

In particular, the semi-protected structure 1110 may still have a second removable material 1106 that may protect the optical structure 1102. The removable material 1106 may be subsequently removed (e.g., peeled away) to yield a structure 1115 that includes the exposed surface of the index gradient optical structure 1102, as shown in FIG. 11.

Figure 12:
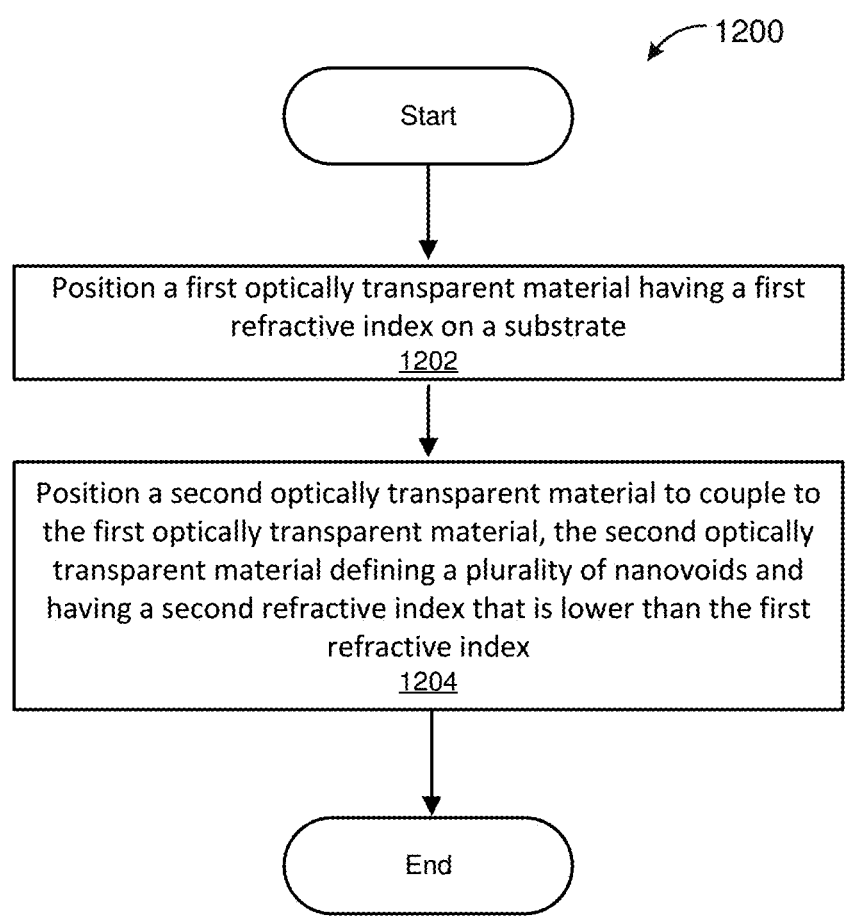
FIG. 12 shows a diagram of an example flow for the fabrication of an optical structure, in accordance with example embodiments of the disclosure.

FIG. 12 shows an example flow diagram illustrating aspects of the fabrication of an optical structure, in accordance with example embodiments of the disclosure. At step 1202, a first optically transparent material having a first refractive index may be positioned on a substrate. In one embodiment, the first refractive index may be between approximately 1.4 and approximately 1.6. In some embodiments, the first optically transparent material may be configured to have a thickness that is approximately a half-wavelength of a center wavelength of incident light.

At step 1204 in FIG. 12, a second optically transparent material may be positioned to couple to the first optically transparent material, the second optically transparent material defining a plurality of nanovoids and having a second refractive index that is lower than the first refractive index.

In one embodiment, the second refractive index may be between approximately 1.0 and approximately 1.3. In another embodiment, the second optically transparent material may include a concentration of the plurality of nanovoids per unit volume that is approximately 10% to approximately 90%. In one embodiment, an optical structure including the first and second optically transparent materials may be configured to have a first average reflectance for normally incident light of a first wavelength range. In another embodiment, the second optically transparent material is configured to have a thickness that is approximately a quarter-wavelength of a center wavelength of incident light.

Figure 13A:
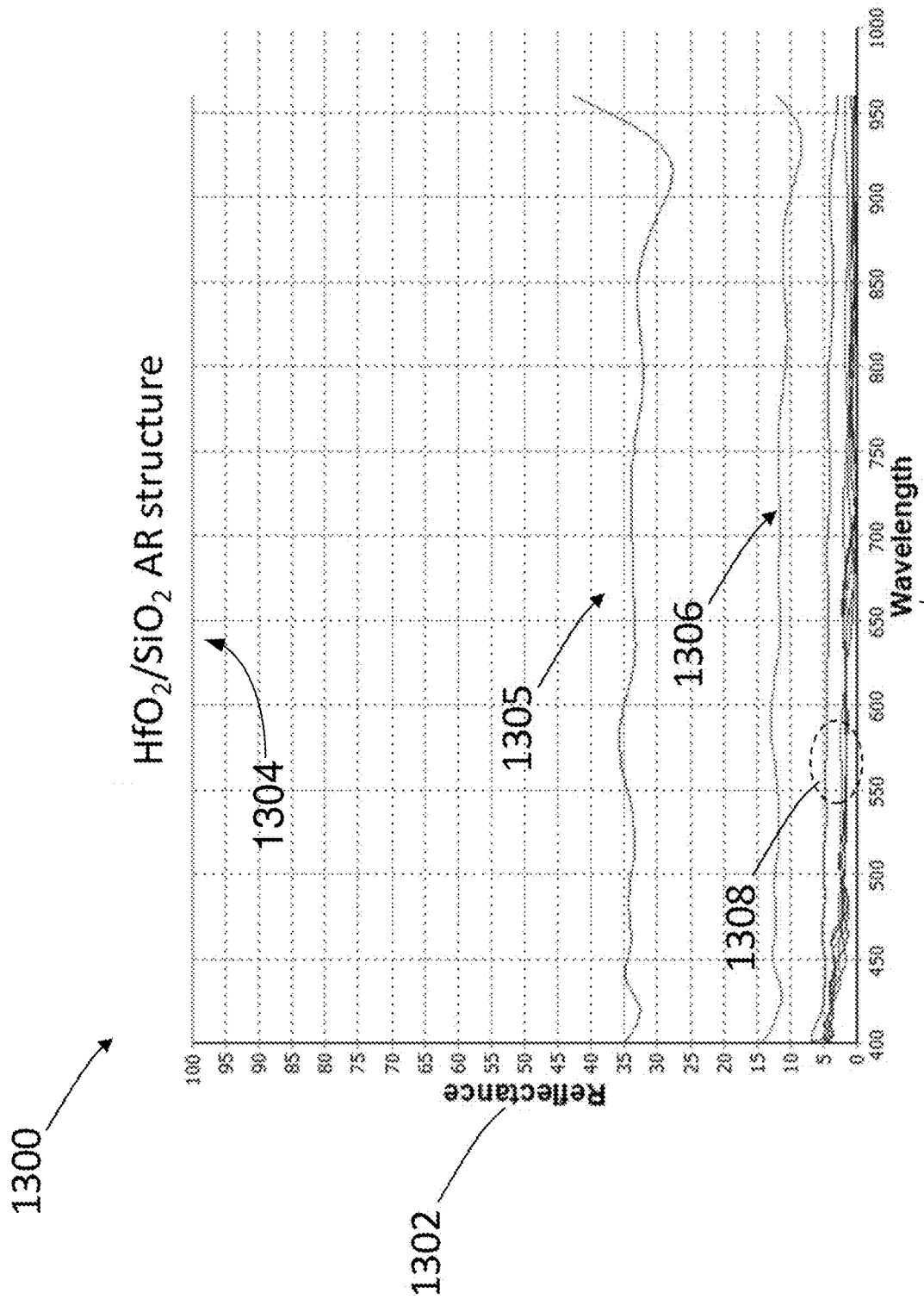
FIG. 13A shows a plot of reflectivity of an $HfO_2/SiO_2$ optical structure, in accordance with example embodiments of the disclosure.

FIG. 13A shows a plot of reflectivity of an $HfO_2/SiO_2$ optical structure (e.g., an AR coating), in accordance with example embodiments of the disclosure. In particular, plot 1300 shows simulations of the reflectance 1302 (in units of percent) of an $HfO_2/SiO_2$ optical structure versus wavelength 1303. In particular, the optical structure has a first optically transparent material including $HfO_2$ and a second optically transparent material including $SiO_2$. Further, the plot 1300 shows a simulation of a first curve 1304 for the reflectance 1302 versus wavelength 1303 for light having a 90-degree deviation from normal incidence, a second curve 1305 for the reflectance 1302 versus wavelength 1303 for light having an 80-degree deviation from normal incidence, a third curve 1306 for the reflectance 1302 versus wavelength 1303 for light having a 70-degree deviation from normal incidence, as well as a group of curves 1308 representing the reflectance 1302 versus wavelength 1303 for light having a range of other lower incidence angles with respect to normal incidence. The group of curves 1308 will be discussed in greater detail in reference to FIG. 13B.

In particular, curve 1304 indicates that the $HfO_2/SiO_2$ optical structure has 100% reflectance for light having a 90-degree deviation from normal incidence for a range of visible wavelengths and infrared wavelengths. Additionally, curve 1305 indicates that the $HfO_2/SiO_2$ optical structure has an approximately 35% reflectance for light having an 80-degree deviation from normal incidence for a range of visible wavelengths (e.g., wavelengths between approximately 400 nm and approximately 750 nm). Further, curve 1306 indicates that the $HfO_2/SiO_2$ optical structure has an approximately 10% to approximately 15% reflectance for light having a 70-degree deviation from normal incidence for a range of visible wavelengths. Further, the group of curves 1308 indicate that the $HfO_2/SiO_2$ optical structure has less than approximately 8% reflectance for light having a range of incidence angles with respect to normal incidence (i.e., normally incident light to light having a 60-degree deviation from normal incidence) for a range of visible wavelengths.

Figure 13B:
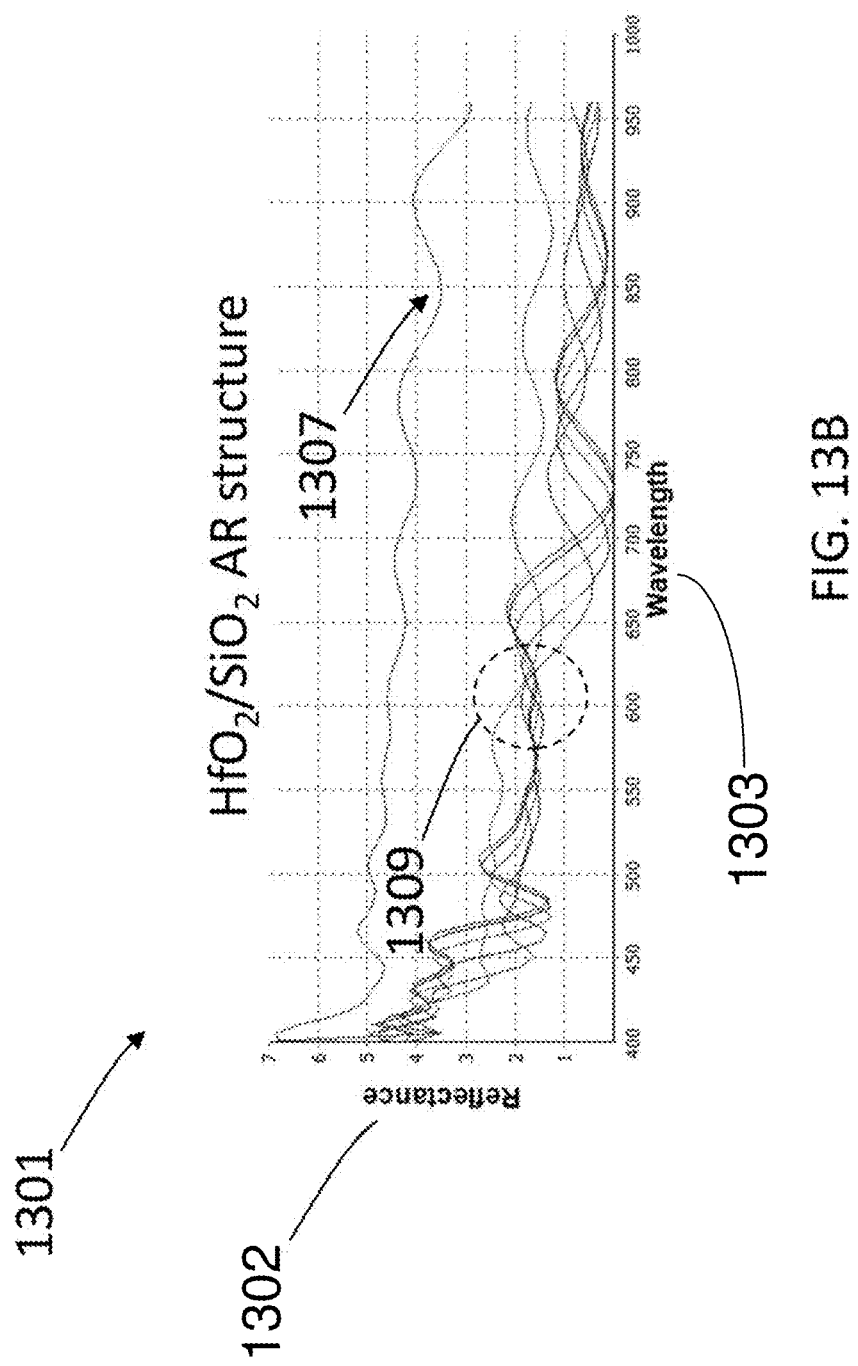
FIG. 13B shows another, close-up plot of reflectivity of an $HfO_2/SiO_2$ optical structure having reflectivity characteristics shown and described in connection with FIG. 13A, in accordance with example embodiments of the disclosure.

FIG. 13B shows another, close-up plot of reflectivity of the $HfO_2/SiO_2$ optical structure having reflectivity characteristics shown and described in connection with FIG. 13A, in accordance with example embodiments of the disclosure. In particular, plot 1301 shows simulations of the reflectance 1302 (in units of percent, from 0% reflectance to approximately 7% reflectance corresponding to the region of plot 1300 in FIG. 13A occupied by the group of curves 1308) of the $HfO_2/SiO_2$ optical structure versus wavelength 1303. In some embodiments, the optical structure has a first optically transparent material including $HfO_2$, and a second optically transparent material including $SiO_2$. The plot 1301 shows a simulation of a first curve 1307 for the reflectance 1302 versus wavelength 1303 for light having a 60-degree deviation from normal incidence, as well as a group of curves 1309 representing the reflectance 1302 versus wavelength 1303 for light having a range of other lower incidence angles with respect to normal incidence. In particular, curve 1307 indicates that the $HfO_2/SiO_2$ optical structure has an approximately 4% to approximately 7% reflectance for light having a 60-degree deviation from normal incidence for a range of visible wavelengths (e.g., wavelengths between approximately 400 nm and approximately 750 nm). Additionally, group of curves 1309 indicates that the $HfO_2/SiO_2$ optical structure has an approximately 0% to approximately 5% reflectance for light having a normal incidence to 50-degree deviation from normal incidence for a range of visible wavelengths.

Figure 14A:
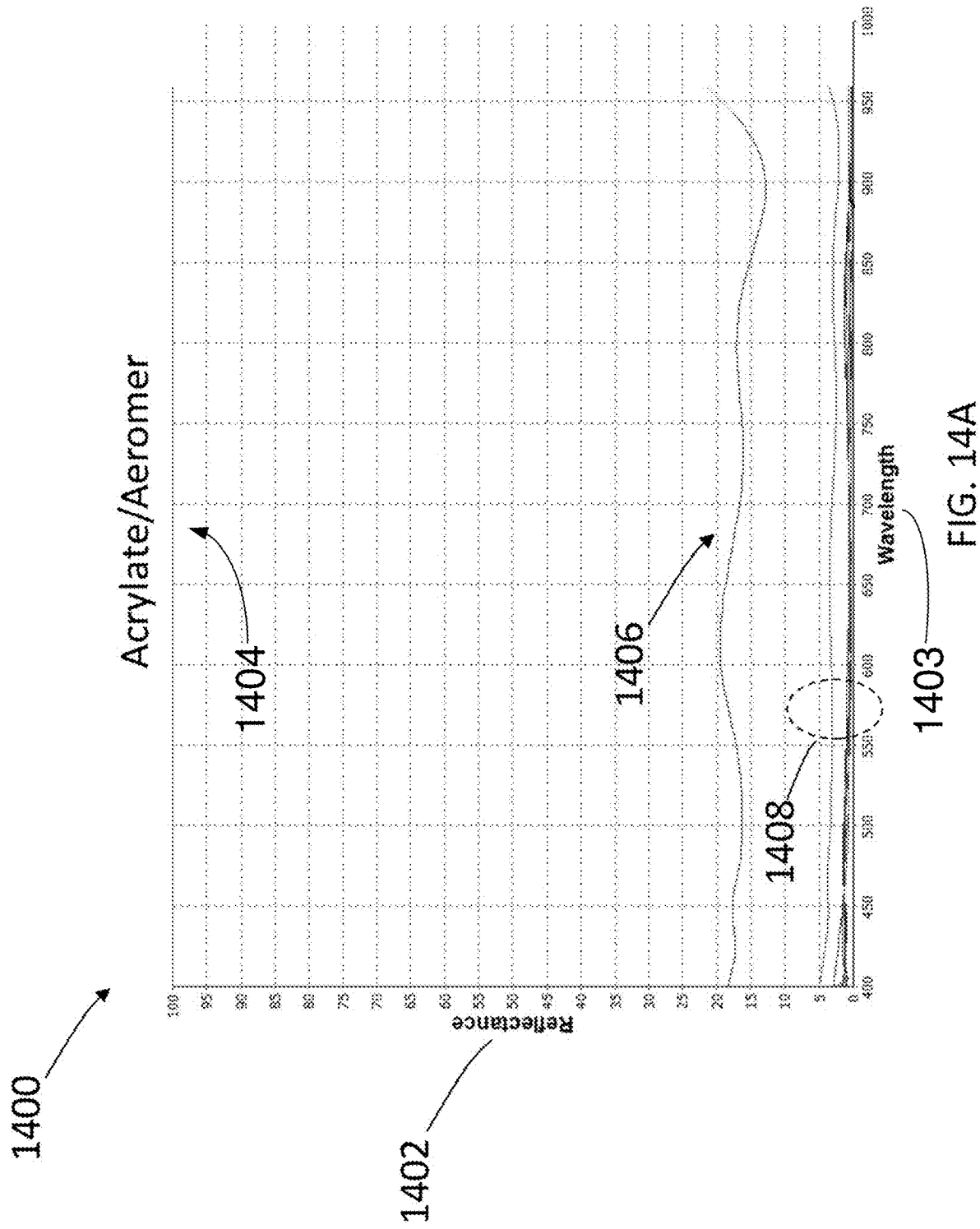
FIG. 14A shows a plot of reflectivity of an acrylate/aeromer optical structure, in accordance with example embodiments of the disclosure.

FIG. 14A shows a plot of reflectivity of an acrylate/aeromer optical structure (e.g., an AR coating), in accordance with example embodiments of the disclosure. In particular, plot 1400 shows simulations of the reflectance 1402 (in units of percent) of an acrylate/aeromer optical structure versus wavelength 1403. The optical structure may have a first optically transparent material including an acrylate, and a second optically transparent material including an aeromer. The aeromer is a nanovoided polymer material and the aeromer, together with the acrylate, forms an optical structure including a nanovoid stack (see, e.g., optical structure 101 of FIG. 1) as described herein. Further, the plot 1400 shows a simulation of a first curve 1404 for the reflectance 1402 versus wavelength 1403 for light having a 90-degree deviation from normal incidence, a second curve 1406 for the reflectance 1402 versus wavelength 1403 for light having an 80-degree deviation from normal incidence, as well as a group of curves 1408 representing the reflectance 1402 versus wavelength 1403 for light having a range of other lower incidence angles with respect to normal incidence. The group of curves 1408 will be discussed in greater detail in reference to FIG. 14B. In particular, curve 1404 indicates that the acrylate/aeromer optical structure has 100% reflectance for light having a 90-degree deviation from normal incidence for a range of visible wavelengths and infrared wavelengths. Additionally, curve 1406 indicates that the acrylate/aeromer optical structure has an approximately 15% to approximately 20% reflectance for light having an 80-degree deviation from normal incidence for a range of visible wavelengths (e.g., wavelengths between approximately 400 nm and approximately 750 nm). Further, the group of curves 1408 indicate that the acrylate/aeromer optical structure has approximately 5% or less reflectance for light having a range of incidence angles with respect to normal incidence (i.e., normally incident light to light having a 70-degree deviation from normal incidence) for a range of visible wavelengths.

Figure 14B:
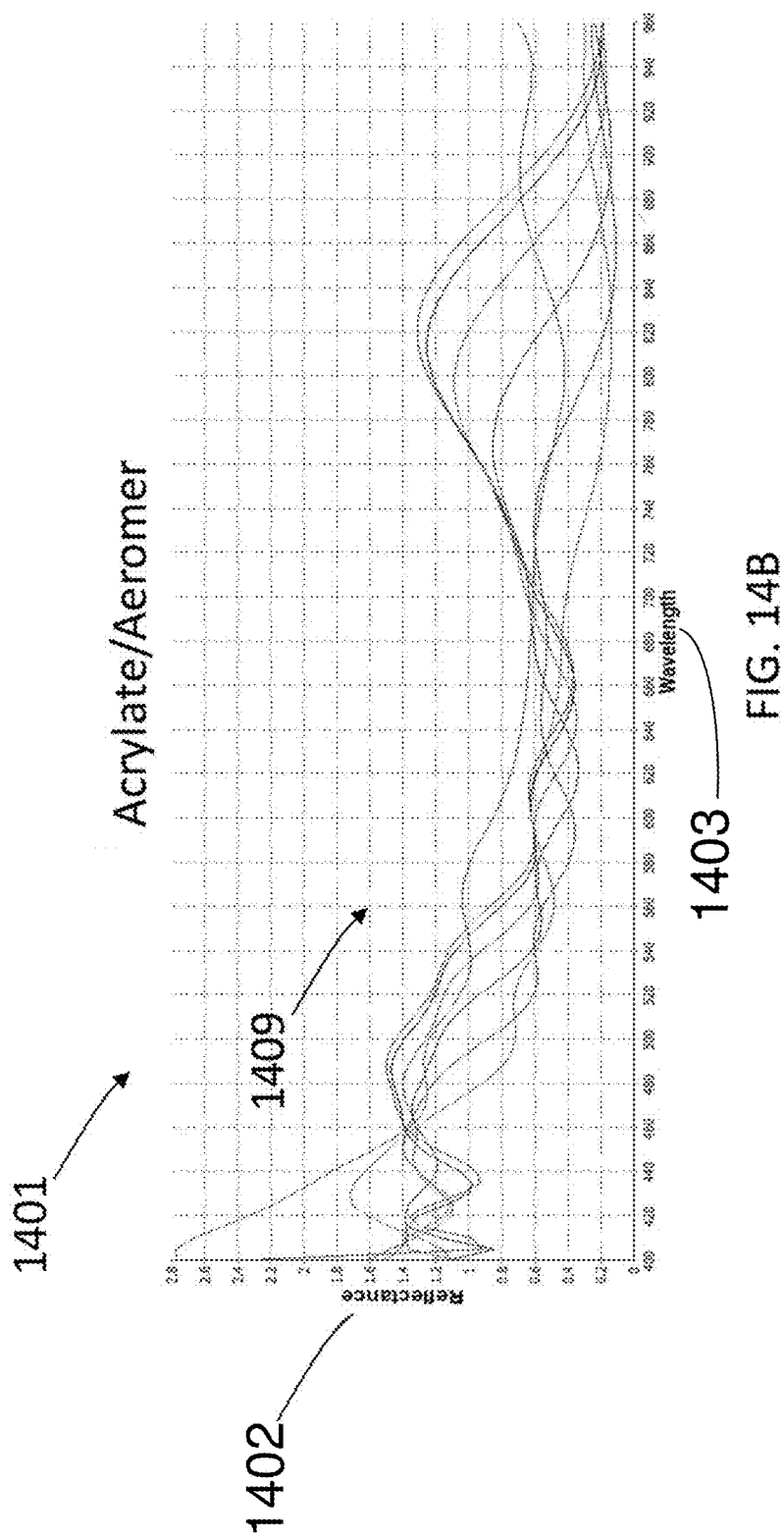
FIG. 14B shows another, close-up plot of reflectivity of the acrylate/aeromer optical structure having reflectivity characteristics shown and described in connection with FIG. 14A, in accordance with example embodiments of the disclosure.

FIG. 14B shows another, close-up plot of reflectivity of the acrylate/aeromer optical structure having reflectivity characteristics shown and described in connection with FIG. 14A, in accordance with example embodiments of the disclosure. In particular, plot 1401 shows simulations of the reflectance 1402 (in units of percent, from 0% reflectance to approximately 2.8% reflectance corresponding to the region of plot 1400 in FIG. 14A occupied by the group of curves 1408) of the acrylate/aeromer optical structure versus wavelength 1403. In some embodiments, the optical structure has a first optically transparent material including acrylate and a second optically transparent material including an aeromer. The plot 1401 shows a simulation of a group of curves 1409 representing the reflectance 1402 versus wavelength 1403 for light having a range of incidence angles with respect to normal incidence. In particular, curve 1409 indicates that the acrylate/aeromer optical structure has an approximately 0% to approximately 2.8% reflectance for light having a normal incidence to 60-degree deviation from normal incidence for a range of visible wavelengths.

Figure 15A:
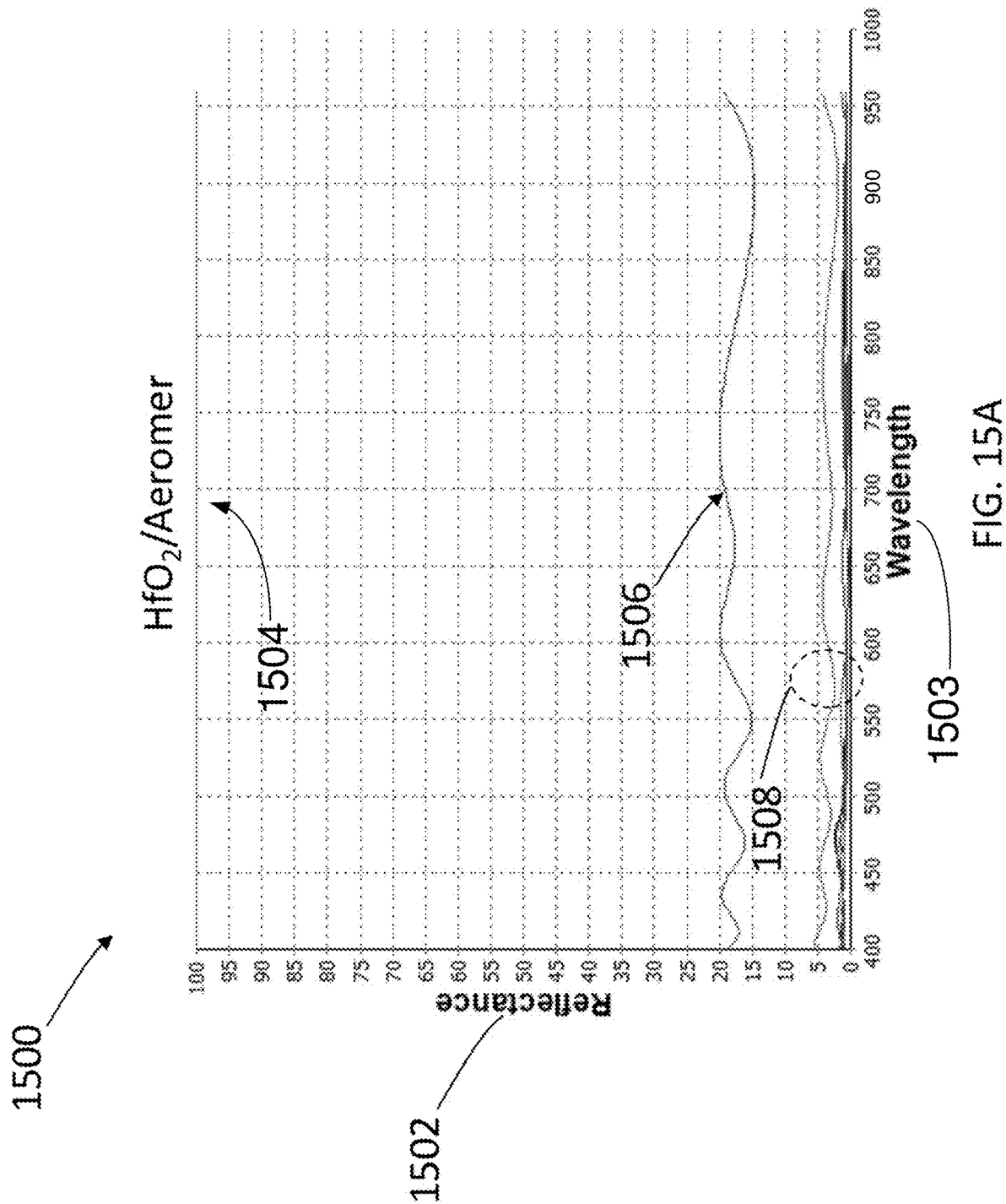
FIG. 15A shows a plot of reflectivity of an $HfO_2$/aeromer optical structure, in accordance with example embodiments of the disclosure.

FIG. 15A shows a plot of reflectivity of an $HfO_2$/aeromer optical structure (e.g., an AR coating), in accordance with example embodiments of the disclosure. In particular, plot 1500 shows simulations of the reflectance 1502 (in units of percent) of an $HfO_2$/aeromer optical structure versus wavelength 1503 including an $HfO_2$/aeromer optical structure, that is, having a first optically transparent material including an $HfO_2$, and a second optically transparent material including an aeromer. The aeromer is a nanovoided polymer material and the aeromer, together with the acrylate, forms an optical structure including a nanovoid stack (see, e.g., optical structure 101 of FIG. 1) as described herein. Further, the plot 1500 shows a simulation of a first curve 1504 for the reflectance 1502 versus wavelength 1503 for light having a 90-degree deviation from normal incidence, a second curve 1506 for the reflectance 1502 versus wavelength 1503 for light having an 80-degree deviation from normal incidence, as well as a group of curves 1508 representing the reflectance 1502 versus wavelength 1503 for light having a range of other lower incidence angles with respect to normal incidence. The group of curves 1508 will be discussed in greater detail in reference to FIG. 15B. In particular, curve 1504 indicates that the acrylate/aeromer optical structure has 100% reflectance for light having a 90-degree deviation from normal incidence for a range of visible wavelengths and infrared wavelengths. Additionally, curve 1506 indicates that the $HfO_2$/aeromer optical structure has an approximately 15% to approximately 20% reflectance for light having an 80-degree deviation from normal incidence for a range of visible wavelengths (e.g., wavelengths between approximately 400 nm and approximately 750 nm). Further, the group of curves 1508 indicate that the HfO2/aeromer optical structure has approximately 5% or less reflectance for light having a range of incidence angles with respect to normal incidence (i.e., normally incident light to light having a 70-degree deviation from normal incidence) for a range of visible wavelengths.

Figure 15B:
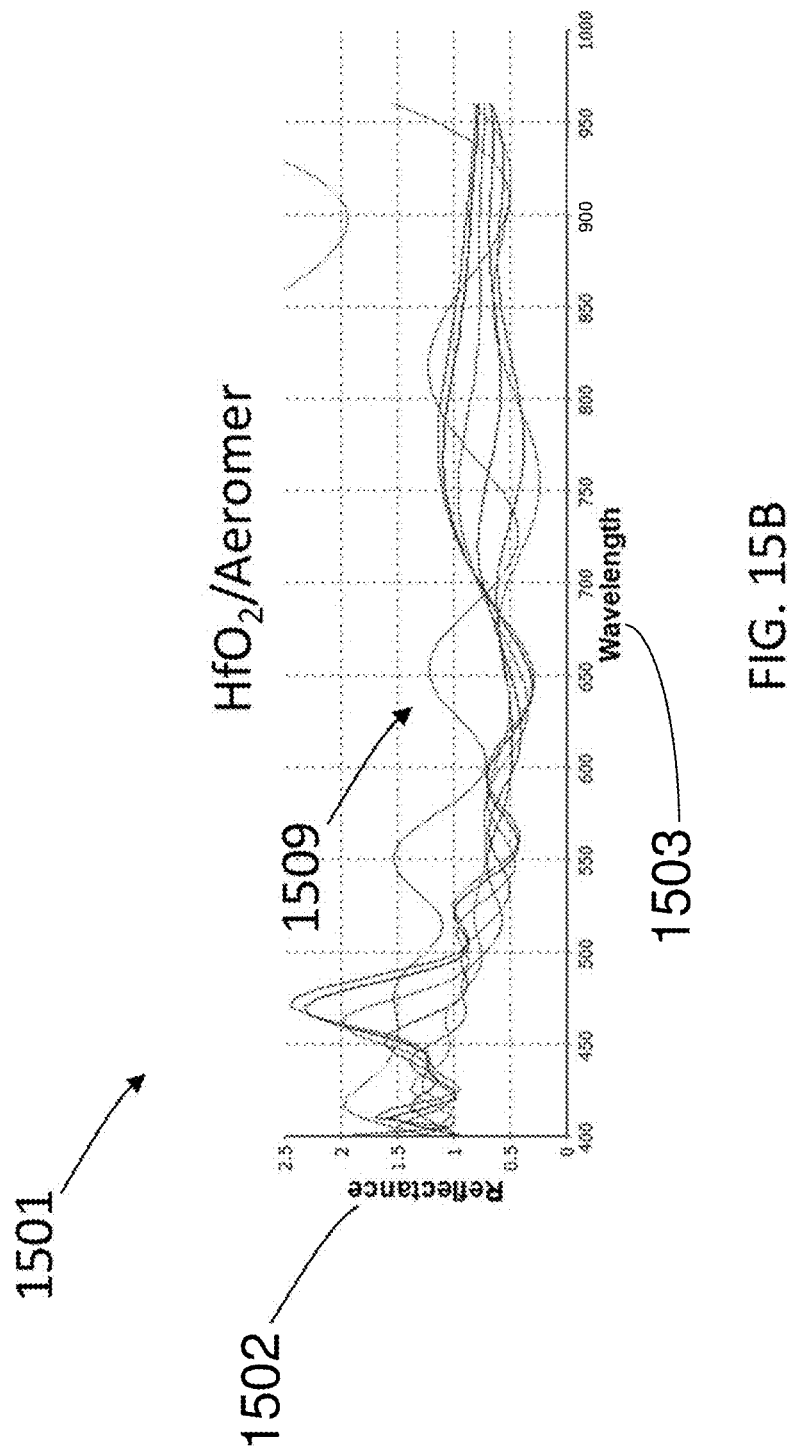
FIG. 15B shows another, close-up plot of reflectivity of the $HfO_2$/aeromer optical structure having reflectivity characteristics shown and described in connection with FIG. 15A, in accordance with example embodiments of the disclosure.

FIG. 15B shows another, close-up plot of reflectivity of the $HfO_2$/aeromer optical structure having reflectivity characteristics shown and described in connection with FIG. 15A, in accordance with example embodiments of the disclosure. In particular, plot 1501 shows simulations of the reflectance 1502 (in units of percent, from 0% reflectance to approximately 2.5% reflectance corresponding to the region of plot 1500 in FIG. 15A occupied by the group of curves 1508) of the $HfO_2$/aeromer optical structure versus wavelength 1503. In some embodiments, the optical structure has a first optically transparent material including $HfO_2$ and a second optically transparent material including an aeromer. The plot 1501 shows a simulation of a group of curves 1509 representing the reflectance 1502 versus wavelength 1503 for light having a range of incidence angles with respect to normal incidence. In particular, curve 1509 indicates that the $HfO_2$/aeromer optical structure has an approximately 0% to approximately 2.5% reflectance for light having a normal incidence to 60-degree deviation from normal incidence for a range of visible wavelengths.

Figure 16:
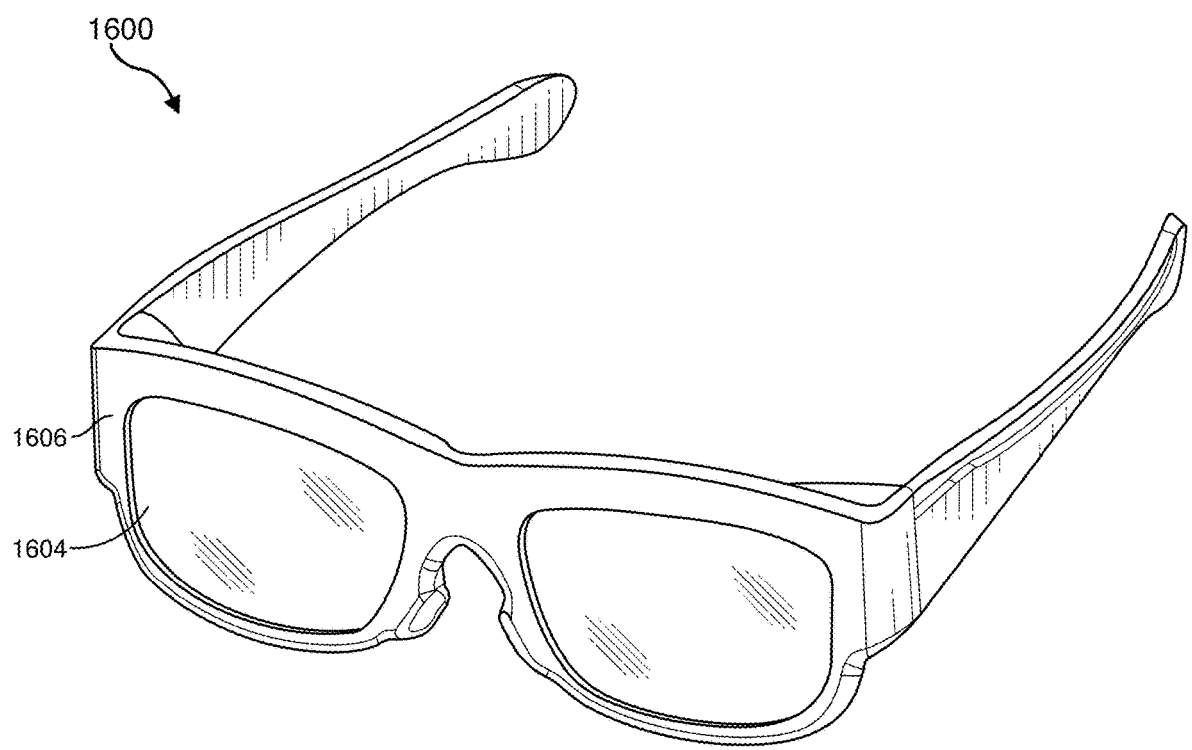
FIG. 16 shows a diagram of a head-mounted display (HMD), in accordance with example embodiments of the disclosure.

FIG. 16 shows a diagram of a head-mounted display (HMD) 1600, in accordance with example embodiments of the disclosure. In some embodiments, the HMD 1600 may include an NED, which may include one or more display devices 1604. The display device 1604 may present media to a user. Examples of media presented by the display device 1604 include one or more images, a series of images (e.g., a video), audio, or some combination thereof. In some embodiments, audio may be presented via an external device (e.g., speakers and/or headphones) that receives audio information from the display device 1604, a console (not shown), or both, and presents audio data based on the audio information. The display device 1604 may be generally configured to operate as an AR NED, such that a user may see media projected by the display device 1604 and see the real-world environment through the display device 1604. However, in some embodiments, the display device 1604 may be modified to also operate as a virtual reality (VR) NED, a mixed reality (MR) NED, or some combination thereof. Accordingly, in some embodiments, the display device 1604 may augment views of a physical, real-world environment with computer-generated elements (e.g., images, video, sound, etc.).

The display device 1604 shown in FIG. 16 may include a support or frame 1606 that secures the display device 1604 in place on the head of a user, in embodiments in which the display device 1604 includes separate left and right displays. In some embodiments, the frame 1606 may be a frame of eye-wear glasses. The display device 1604 may include structures (e.g., waveguides) with devices (e.g., switchable optical structures such as switchable Bragg gratings and/or reflectors, etc.) as described herein. In some embodiments, the devices may be manufactured by the processes described herein.

As noted, the nanovoided layers may be used in the fabrication of an optical structure such as a switchable Bragg reflector or grating. In some embodiments, the nanovoided layers may be used to fabricate mirrors for AR systems that may include partially transparent displays that mix digital images with the real world. Light rays may reflect off a mirror to redirect into a user's eye. In other words, the eye may receive redirected rays from the digital display (e.g., from a projector or light-emitting diodes). Further, the optical device that combines the generated digital image with the real-world light may be referred to as a combiner. The combiner may operate like a partial mirror that redirects display light and selectively lets light in through from the real world. In such applications, a high reflectivity for the redirected light along with a high transmission for ambient light may be desired. In another embodiment, the combiner may be fabricated using the nanovoided layers, such that when the combiner is switched on the combiner is reflective. Further, the display light may be pulsed, and the combiner may be switched off so that the combiner is transmissive for real-world light, but simultaneously reflects a portion of the display light for overlaying images onto the user's field of view. In some embodiments, the disclosed devices (e.g., the switchable optical structures including Bragg gratings and reflectors) may have higher contrast, lower polarization sensitivity, and higher switching times than comparable devices that use liquid crystals.

Embodiments of the instant disclosure may include or be implemented in conjunction with an artificial reality system. Artificial reality is a form of reality that has been adjusted in some manner before presentation to a user, which, as noted, may include, e.g., a VR, an AR, a MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical structure, comprising:
a first optically transparent material having a first refractive index and a first thickness that is approximately a half-wavelength of a center wavelength of incident light; and
a second optically transparent material coupled to the first optically transparent material, the second optically transparent material defining a plurality of nanovoids and having a second refractive index that is lower than the first refractive index and a second thickness that is approximately a quarter-wavelength of a center wavelength of incident light,
wherein the second optically transparent material comprises a concentration of the plurality of nanovoids per unit volume that is approximately 10% to approximately 90%.

2. The optical structure of claim 1, wherein the first optically transparent material comprises a polymer or an oxide.

3. The optical structure of claim 1, wherein the first refractive index is between approximately 1.4 and approximately 1.6.

4. The optical structure of claim 1, wherein the second refractive index is between approximately 1.0 and approximately 1.3.

5. The optical structure of claim 1, wherein the optical structure further comprises a first set of additional optically transparent materials that each have a refractive index that is substantially equal to the first refractive index, and a second set of additional optically transparent materials that each define a plurality of nanovoids and have a refractive index that is lower than the first refractive index.

6. The optical structure of claim 5, wherein the optical structure is configured to have a first average reflectance for normally incident light of a first wavelength range, the first wavelength range based at least in part on the first set of additional optically transparent materials or the second set of additional optically transparent materials.

7. An optical system, comprising:
an optical component;
an optical structure coupled to the optical component, the optical structure comprising:
a first optically transparent material having a first refractive index and a first thickness that is approximately a half-wavelength of a center wavelength of incident light; and
a second optically transparent material coupled to the first optically transparent material, the second optically transparent material defining a plurality of nanovoids and having a second refractive index that is lower than the first refractive index and a second thickness that is approximately a quarter-wavelength of a center wavelength of incident light,
wherein the second optically transparent material comprises a concentration of the plurality of nanovoids per unit volume that is approximately 10% to approximately 90%.

8. The optical system of claim 7, wherein the optical component comprises at least one of a refractive element, a polarizing element, or a reflective element.

9. The optical system of claim 8, wherein the optical structure is laminated to a surface of the optical component.

10. The optical system of claim 7, wherein the optical structure is coupled to a surface of the optical component by an adhesive material.

11. The optical system of claim 10, wherein the surface of the optical component is convex, concave, flat, or irregular.

12. The optical structure of claim 7, wherein the first refractive index is between approximately 1.4 and approximately 1.6, and the second refractive index is between approximately 1.0 and approximately 1.3.

13. The optical structure of claim 1, further comprising a first transparent conductor positioned on a first side of the optical structure and a second transparent conductor positioned on a second, opposite side of the optical structure, wherein application of a voltage applied to the first and second transparent conductors may cause the optical structure to be mechanically compressed.

14. The optical structure of claim 13, wherein each of the first transparent conductor and the second transparent conductor comprises at least one of the following materials; indium tin oxide, a transparent conductive oxide, a metal grid, carbon nanotubes, graphene, a nanowire mesh, a thin-metal film, a doped binary compound, or a conductive polymer.

* * * * *

UNITED STATES PATENT AND TRADEMARK OFFICE
CERTIFICATE OF CORRECTION

PATENT NO. : 11,243,333 B1
APPLICATION NO. : 16/170002
DATED : February 8, 2022
INVENTOR(S) : Andrew John Ouderkirk et al.

It is certified that error appears in the above-identified patent and that said Letters Patent is hereby corrected as shown below:

In the Claims

Column 34, Line 46, Claim 12, delete "optical structure" and insert -- optical system --.

Column 34, Line 59, Claim 14, delete "materials;" and insert -- materials: --.

Signed and Sealed this
Twenty-sixth Day of April, 2022

Katherine Kelly Vidal
*Director of the United States Patent and Trademark Office*